United States Patent
Kapoor et al.

(10) Patent No.: US 9,808,815 B2
(45) Date of Patent: Nov. 7, 2017

(54) ATOMIZING-BASED CUTTING FLUID DELIVERY SYSTEM AND METHOD

(71) Applicant: The Board of Trustees of the University of Illinois, Urbana, IL (US)

(72) Inventors: Shiv G. Kapoor, Champaign, IL (US); Chandra Nath, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 690 days.

(21) Appl. No.: 14/285,283

(22) Filed: May 22, 2014

(65) Prior Publication Data
US 2014/0353406 A1    Dec. 4, 2014

Related U.S. Application Data

(60) Provisional application No. 61/830,262, filed on Jun. 3, 2013.

(51) Int. Cl.
*B23Q 11/00* (2006.01)
*B05B 7/00* (2006.01)
(Continued)

(52) U.S. Cl.
CPC .......... *B05B 7/0075* (2013.01); *B05B 7/0012* (2013.01); *B05B 7/0869* (2013.01);
(Continued)

(58) Field of Classification Search
CPC ... B05B 7/0075; B05B 7/2483; B05B 7/0012; B05B 7/0864; B23Q 11/1038; B23Q 11/1046; B23Q 11/10; B23Q 11/1076
See application file for complete search history.

(56) References Cited

U.S. PATENT DOCUMENTS

| | | | | |
|---|---|---|---|---|
| 2,050,368 A | * | 8/1936 | Neely | B05B 7/0475 239/406 |
| 2,929,566 A | * | 3/1960 | Paasche | B23Q 11/1084 239/273 |

(Continued)

OTHER PUBLICATIONS

Clarens, A., et al., "Evaluation of Cooling Potential and Tool Life in Turning Using Metalworking Fluids Delivered in Supercritical Carbon Dioxide", Proceedings of the 2009 ASME International Manufacturing Science and Engineering Conference, West Lafayette, Indiana, US, Oct. 4-7, 2009, (9 pages).

(Continued)

*Primary Examiner* — Will Fridie, Jr.
(74) *Attorney, Agent, or Firm* — Greer, Burns & Crain, Ltd.; Steven P. Fallon

(57) ABSTRACT

An atomizing cutting fluid system. The system includes a common chamber terminating in a shaped droplet nozzle and including a nozzle section immediately behind the shaped droplet nozzle. An atomizer creates spray directly within the common chamber behind the nozzle section. A cutting fluid supply line provides cutting fluid to the atomizer. A high velocity gas nozzle within the nozzle section and behind the droplet nozzle is configured to provide a high velocity gas to entrain the flow of droplets. The nozzle section and droplet nozzle are configured to produce a fully developed droplets-gas flow at a predetermined distance from the droplet nozzle. In a cutting system, the spray system provides a uniform film for a macro or micro cutting operation at sufficient flow rates.

17 Claims, 16 Drawing Sheets

(51) Int. Cl.
B23Q 11/10 (2006.01)
B05B 7/08 (2006.01)
B05B 17/06 (2006.01)

(52) U.S. Cl.
CPC .......... B05B 17/06 (2013.01); B23Q 11/1046 (2013.01); B23Q 11/1053 (2013.01)

(56) References Cited

U.S. PATENT DOCUMENTS

| | | | | |
|---|---|---|---|---|
| 3,342,086 | A | * | 9/1967 | Borman .................. B23Q 11/10 29/DIG. 66 |
| 3,382,845 | A | * | 5/1968 | Jester .................... B05B 7/0012 118/301 |
| 3,478,843 | A | * | 11/1969 | Eckardt .............. B23Q 11/1046 184/55.1 |
| 3,570,332 | A | * | 3/1971 | Beake ................ B23Q 11/1076 407/11 |
| 3,577,808 | A | * | 5/1971 | Visser ..................... B23P 25/00 261/78.2 |
| 3,814,328 | A | * | 6/1974 | Warning ............... B05B 7/1272 239/296 |
| 4,829,859 | A | * | 5/1989 | Yankoff ............. B23Q 11/1053 407/11 |
| 5,190,421 | A | * | 3/1993 | Wen ....................... B23Q 11/10 184/6.14 |
| 5,833,523 | A | * | 11/1998 | Hykes ...................... B24B 5/42 451/450 |
| 2005/0271484 | A1 | * | 12/2005 | Sugata ................. B23Q 39/023 408/57 |
| 2007/0177953 | A1 | * | 8/2007 | Matsumura ............. B23B 31/02 409/136 |
| 2013/0206441 | A1 | * | 8/2013 | Roser ................... B05B 17/063 173/199 |
| 2014/0353406 | A1 | * | 12/2014 | Kapoor ................ B05B 7/0075 239/379 |

OTHER PUBLICATIONS

Rukosuyev, M., et al., "Design and development of cutting fluid system based on ultrasonic atomization for micro-machining", Transactions of NAMRI/SME, (2010), 38, pp. 97-104.

Cheng, C., et al, "Treatment of spent metalworking fluids", Water Research, vol. 39, Issue 17, Oct. 2005, pp. 4051-4063.

Clarens, A., et al., "Feasibility of Metalworking Fluids Delivered in Supercritical Carbon Dioxide", Journal of Manufacturing Processes vol. 8, No. 1, (2006), 7 pages.

Ghai, I., et al., "Droplet Behavior on a Rotating Surface for Atomization-Based Cutting Fluid Application in Micromachining", ASME Transactions, Journal of Manufacturing Science and Engineering vol. 132, Issue 1, Feb. 3, 2010, 10 pages.

Ghai, I., et al., "Analysis of droplet behavior on a rotating surface in atomization-based cutting fluid systems for micro-machining", MS Thesis, University of Illinois at Urbana-Champaign, Urbana, Illinois, USA, (2010), 163 pages.

Hong, Shane Y., et al., "New cooling approach tool and tool life improvement in cryogenic machining of titanium alloy Ti—6Al—4V", International Journal of Machine Tools & Manufacture, 41, (2001), pp. 2245-2260.

Jun, M.B.G., et al., "An Experimental Evaluation of an Atomization-Based Cutting Fluid Application System for Micro-Machining", ASME Transactions—Journal of Manufacturing Science and Engineering, 130(3), 031118, Jun. 12, 2008 (8 pages).

Nandy, A. K., et al., "Effect of coolant pressure, nozzle diameter, impingement angle, and spot distance in high pressure cooling with neat oil in turning Ti—6Al—4V", Machining Science and Technology: An International Journal, vol. 12, Issue 4, Dec. 10, 2008, pp. 445-473.

Nandy, A. K., et al., "Some studies on high-pressure cooling in turning of Ti—6Al—4V", International Journal of Machine Tools and Manufacture, vol. 49, Issue 2, Feb. 2009, pp. 182-198.

Nath, Chandra, et al., Design and evaluation of an atomization-based cutting fluid spray system in turning of titanium alloy. In Proceedings of the NAMRI/SME, vol. 40, Notre Dame, Indiana, USA, Jun. 4-8, 2012, 8 pages.

Nath, Chandra, et al., "Droplet spray behavior of an atomization-based cutting fluid (ACF) system for machining titanium alloys", In Proceedings of the ASME 2012 International Mechanical Engineering Congress and Exposition (IMECE), Houston, TX, USA, Nov. 9-15, 2012, 11 pages.

Palanisamy, S., et al., "Effects of coolant pressure on chip formation while turning Ti6Al4V alloy", International Journal of Machine Tools and Manufacture, vol. 49, Issue 9, Jul. 2009, pp. 739-743.

Pusavec, Franci, et al., "Transitioning to sustainable production—Part I: application on machining technologies", Journal of Cleaner Production, vol. 18, Issue 2, Jan. 2010, pp. 174-184.

Rukosuyev, M., et al., "Understanding the effects of system parameters of an ultrasonic cutting fluid application system for rnicromachining", Journal of Manufacturing Processes, 12: Jan. 2010, pp. 92-98.

* cited by examiner

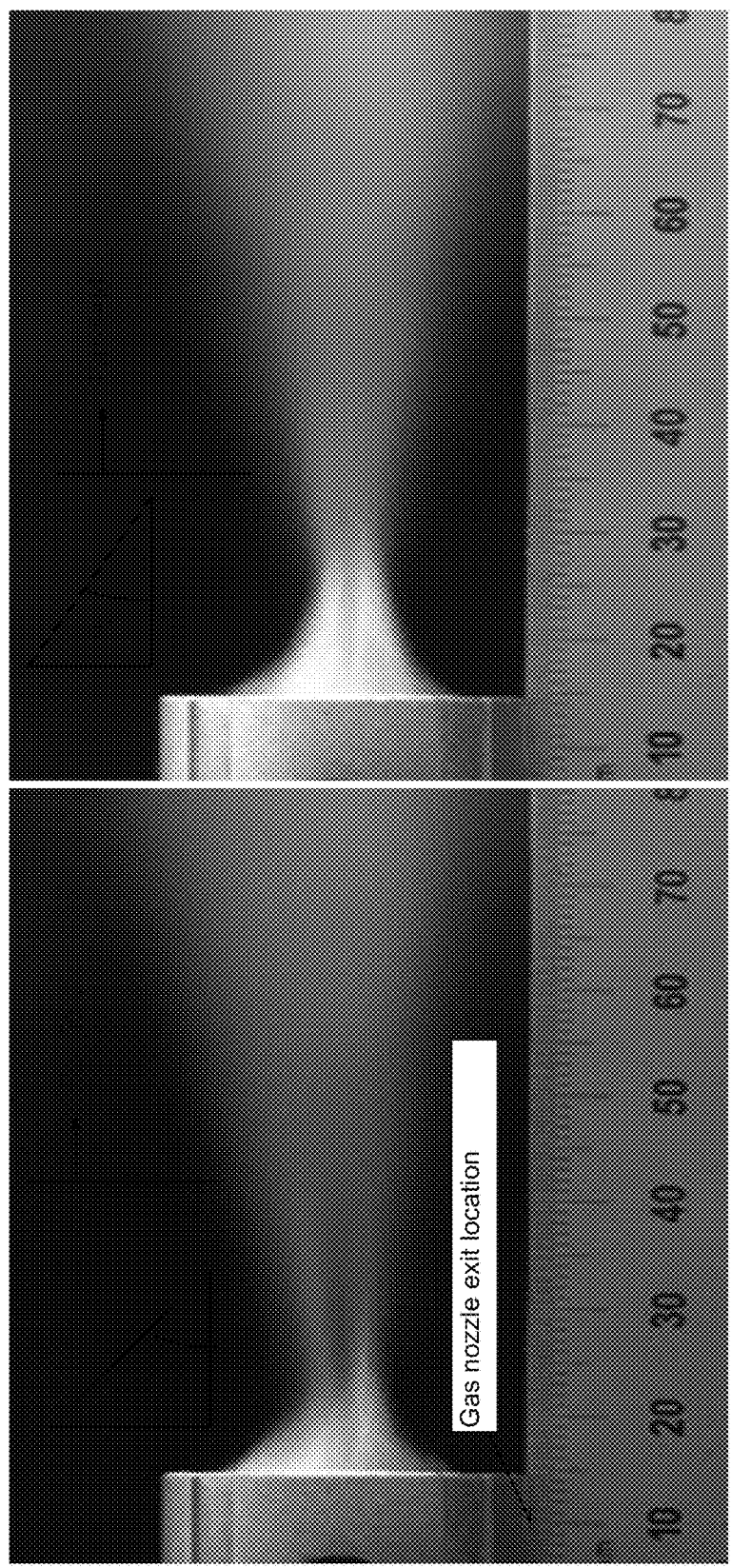

$\theta_r = 29.05°$, FF ≥ 30 mm $\theta_r = 55.0°$, FF ≥ 35 mm

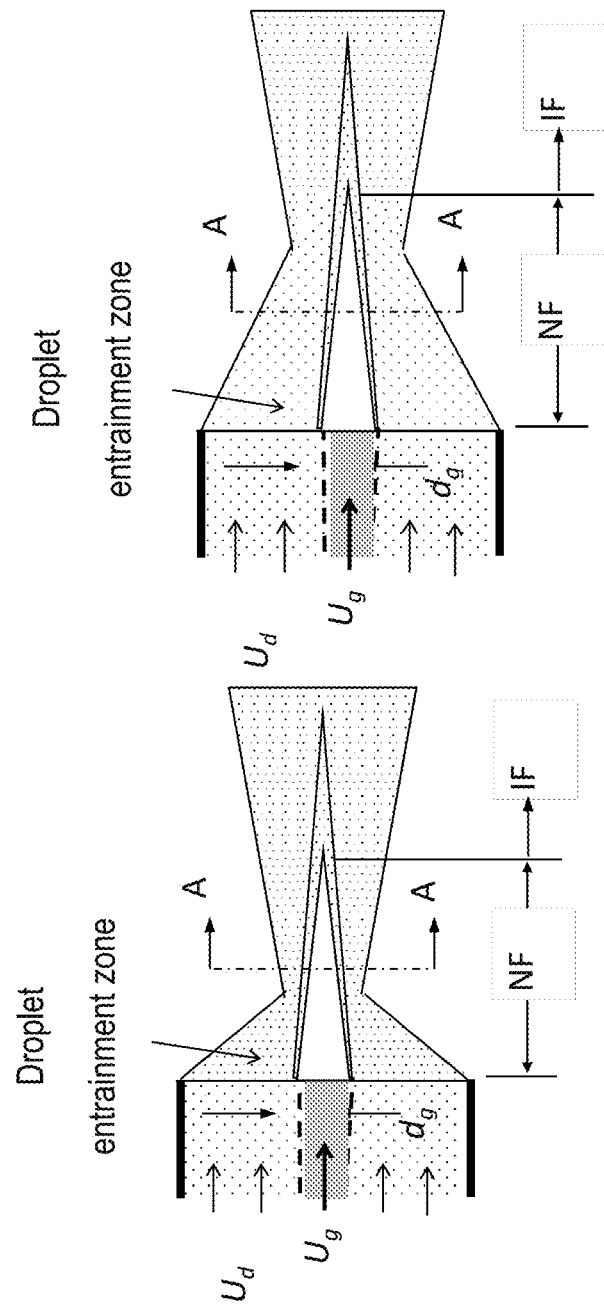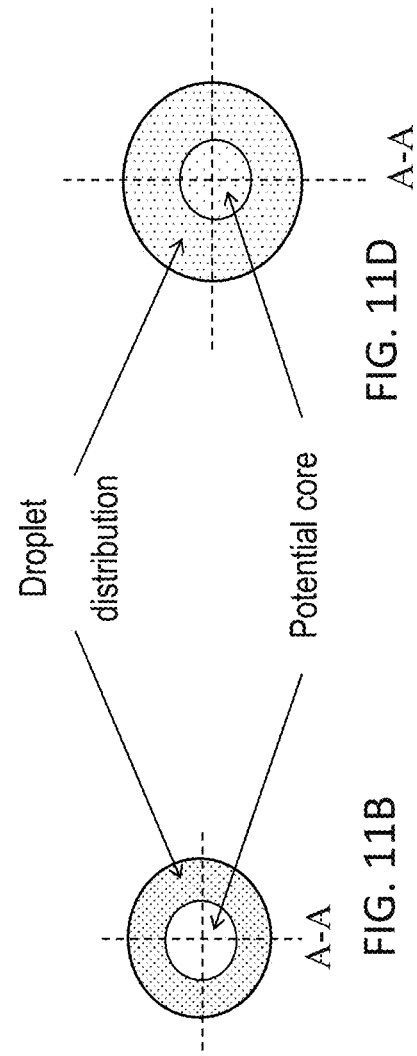
FIG. 11C
FIG. 11D
FIG. 11A
FIG. 11B

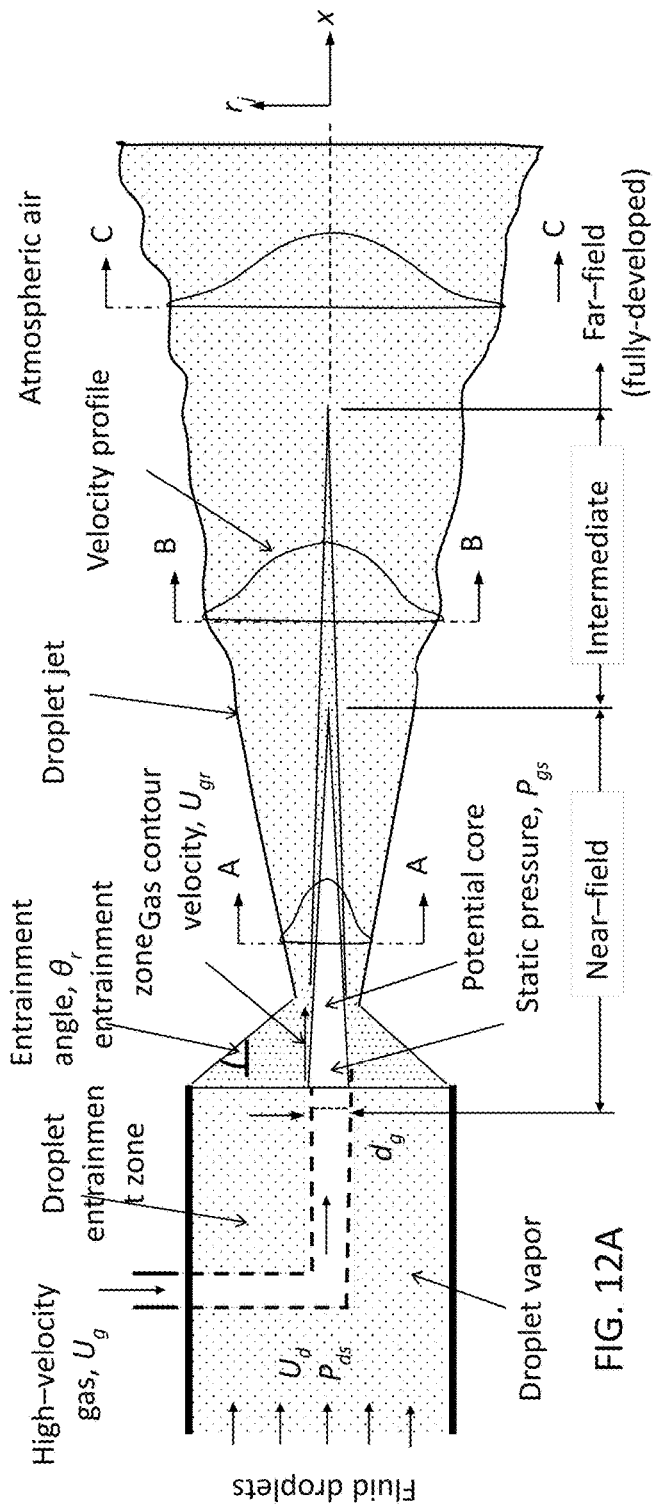
FIG. 12A
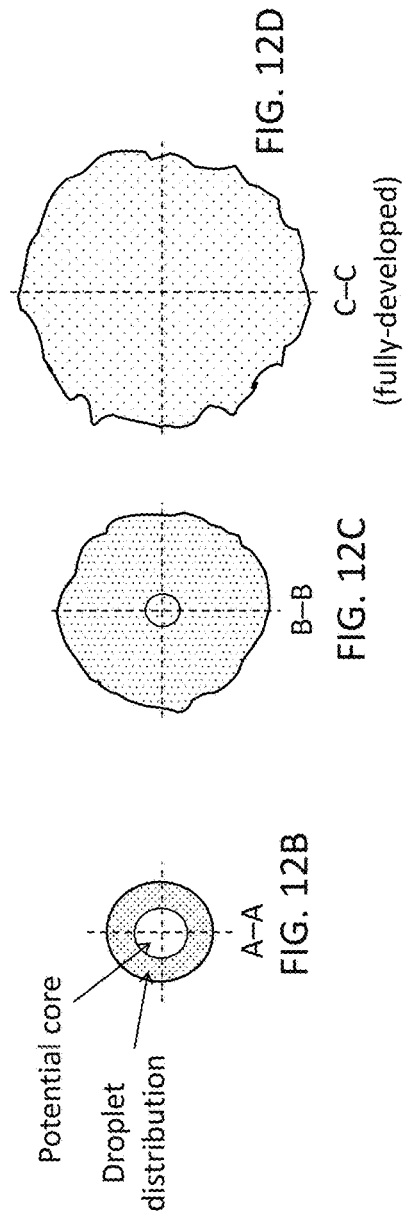
FIG. 12B
FIG. 12C
FIG. 12D

ATOMIZING-BASED CUTTING FLUID DELIVERY SYSTEM AND METHOD

PRIORITY CLAIM AND REFERENCE TO RELATED APPLICATION

This application claims priority under 35 U.S.C. §119 from prior provisional application Ser. No. 61/830,262, which was filed Jun. 3, 2013.

FIELD

A field of the invention is machining of metals and metal alloys. The invention provides an atomization-based system and method for creating and applying a thin film of cutting fluid that can be used for cooling and lubrication in machining. An example application of the invention is titanium alloy machining.

BACKGROUND

Hard to machine materials, such as titanium and its alloys, produce localized extreme temperatures during machining. This limits cutting efficiency and also quickly wears out expensive tools. Short tool life leads to frequent interruptions in manufacturing, high maintenance costs, and sometimes damage to an expensive workpiece being machined. Damage to a workpiece increases manufacturing defect rates and raises expense overall.

Titanium alloys are often used to produce complex and critical parts used, for example, in aircraft and medical implants. Additional example applications include aerospace structures and engines, rockets, spacecraft, turbines, automotive engine components, nuclear and chemical plants, petrochemical industries, offshore engineering, food processing, and biomedical devices. The alloys possess high strength-to-weight ratio, high-temperature strength, strong fracture and corrosion resistance, and biocompatibility.

Titanium alloys are very difficult to machine, however, and tool life is poor in systems that machine titanium. Titanium has poor thermal conductivity and low elongation-to-break ratio. Titanium is also chemically reactive with typical tool materials at a cutting temperature of 500° C. and above. As a result, highly-localized temperatures are developed at the tool-chip interface. Severe edge chipping and plastic deformation via galling and seizure of chips are often produced. This ultimately shortens tool life, can be detrimental to surface finish, and can cause parts to fail quality requirements.

Various efforts have been made to address these problems in machining titanium. One technique is known as flood cooling. See, e.g., Nandy, A. K., et al., "Some studies on high-pressure cooling in turning of Ti-6Al-4V," International Journal of Machine Tools and Manufacture, 49: 182-198 (2009); Cheng, C., et al., "Treatment of spent metalworking fluids," Water Research, 39: 4051-4063 (2005). The flood techniques are used in practice, despite relatively ineffectiveness and also unfriendliness to the environment due to large quantities of toxic fluids used for cooling/lubrication.

High pressure cooling technique applies coolant at 70-160 bar or more directly at the tool/workpiece interface. A three to four-folds tool life increase compared to flood cooling has been reported by some. See, e.g., Nandy & Paul, "Effect of coolant pressure, nozzle diameter, impingement angle, and spot distance in high pressure cooling with neat oil in turning Ti-6Al-4V," Machining Science and Technology, 12: 445-473 (2008); Palanisamy, S., et al., "Effects of coolant pressure on chip formation while turning Ti6Al4V alloy," International Journal of Machine Tools and Manufacture, 49: 739-743 (2009). In practice however, overall productivity improvements have been reported to be about 50%. The lower productivity improvement is attributable to a higher consumption rate of the cutting fluid, its delivery cost at such high pressure, and the system setup cost. Pusavec, F., et al., "Transition to sustainable production-Part I: application on machining technologies," Journal of Cleaner Production, 18: 174-184 (2010).

Another difficult to implement process is cryogenic cooling. While offering improved tool life, this is an energy-intensive process that requires liquid nitrogen ($LN_2$) to be delivered at high rates in the range of about 45-250 L/hr. Hong, S. Y., et al., "New cooling approach and tool life improvement in cryogenic machining of titanium alloy Ti-6Al-4V," International Journal of Machine Tools and Manufacture, 41: 2245-2260 (2001). The liquid nitrogen delivery also poses safety risks to operators and other personnel.

With a goal of environmental friendliness, others have used supercritical $CO_2$ ($scCO_2$) as a solvent to dissolve cutting fluid. Clarens et al., "Evaluation of cooling potential and tool life in turning using metalworking fluids delivered in supercritical carbon dioxide," Proc. of the ASME International Manufacturing Science and Engineering Conference (MSEC), October 4-7, West Lafayette, Ind., USA (2009). In this method, $CO_2$ gas is provided at levels substantially above its critical pressure, 72.8 bar. Tool wear rates realized during micro-machining were approximately equal to those of conventional flood emulsion systems. In experiments described in this paper, $scCO_2$ spray was provided at 130 bar. These high pressures required a heavy and sophisticated system layout. The costs are prohibitive for such a system, given the lack in improvement over the flood techniques. Also, high pressures pose safety risks to operators and the other personnel. Finally, only low cutting speeds of ~45 m/min and depth of cut (0.27 mm) was reported, which would not be well-suited for macro-machining applications.

Efforts by some of the present inventors and colleagues have focused on atomized spray application of cutting fluids, and have proven to be successful in micro-machining applications. Micro-machining of AISI 1018 steel with atomized cutting fluid droplets was demonstrated in Jun, Joshi, DeVor, and Kapoor, "An experimental evaluation of an atomization-based cutting fluid application system for micromachining," ASME Transactions—Journal of Manufacturing Science and Engineering, 130: 0311181-8 (2008). This system was limited to a flow rate of about 1 mL/min, which is ill-suited toward macro-machining applications in general, and also toward the more difficult materials, such as titanium alloys. Macro-machining applications require machining at or above about 1 mm depth of cut and 0.1 mm/rev or higher feed rate. This larger cutting zone creates faster evaporation rates and, in the disclosed set-up, a small amount of cutting fluid can even evaporate prior to reaching the tool-workpiece interface.

Typical commercial nozzle units used in minimum quantity lubrication (MQL) systems employ a high-velocity gas to produce fluid droplets with shear mechanism. The size of fluid droplets varies in a wide range in such systems. The fluid flow rate in these systems is typically limited at ~2-3 mL/min, a level that is insufficient for providing cooling and lubrication effect during machining at the macro-scale.

Machining of difficult materials, especially of materials having properties like titanium alloys, and especially at the macro-machining level, remains inefficient and expensive. Tools are replaced often and machine surfaces can exhibit defects. Defects can compromise part integrity and can cause a high part rejection rate, leading to additional expense.

SUMMARY OF THE INVENTION

An embodiment of the invention provides an atomizing cutting fluid system. The system includes a common chamber terminating in a shaped droplet nozzle and including a nozzle section immediately behind the shaped droplet nozzle. An atomizer creates spray directly within the common chamber behind the nozzle section. A cutting fluid supply line provides cutting fluid to the atomizer. A high velocity gas nozzle within the nozzle section and behind the droplet nozzle is configured to provide a high velocity gas to entrain the flow of droplets. The nozzle section and droplet nozzle are configured to produce a fully developed droplets-gas co-flow at a predetermined distance from the nozzle section. In a cutting system, the spray system provides a uniform film for a micro or macro cutting operation at sufficient flow rates.

BRIEF DESCRIPTION OF THE DRAWINGS

FIGS. 9A-9D are images of experimental cutting fluid sprays produced in experiments with different combinations of droplet and gas velocities;

FIGS. 11A and 11B together and FIGS. 11C and 11D together respectively illustrate schematic diagrams for a larger and a smaller droplet impingement angles; and FIG. 12A schematically illustrates a fluid spray and FIGS. 12B-12D schematically illustrate spray cross section at near, intermediate and far-field locations.

DETAILED DESCRIPTION OF THE PREFERRED EMBODIMENTS

Figure 1A:
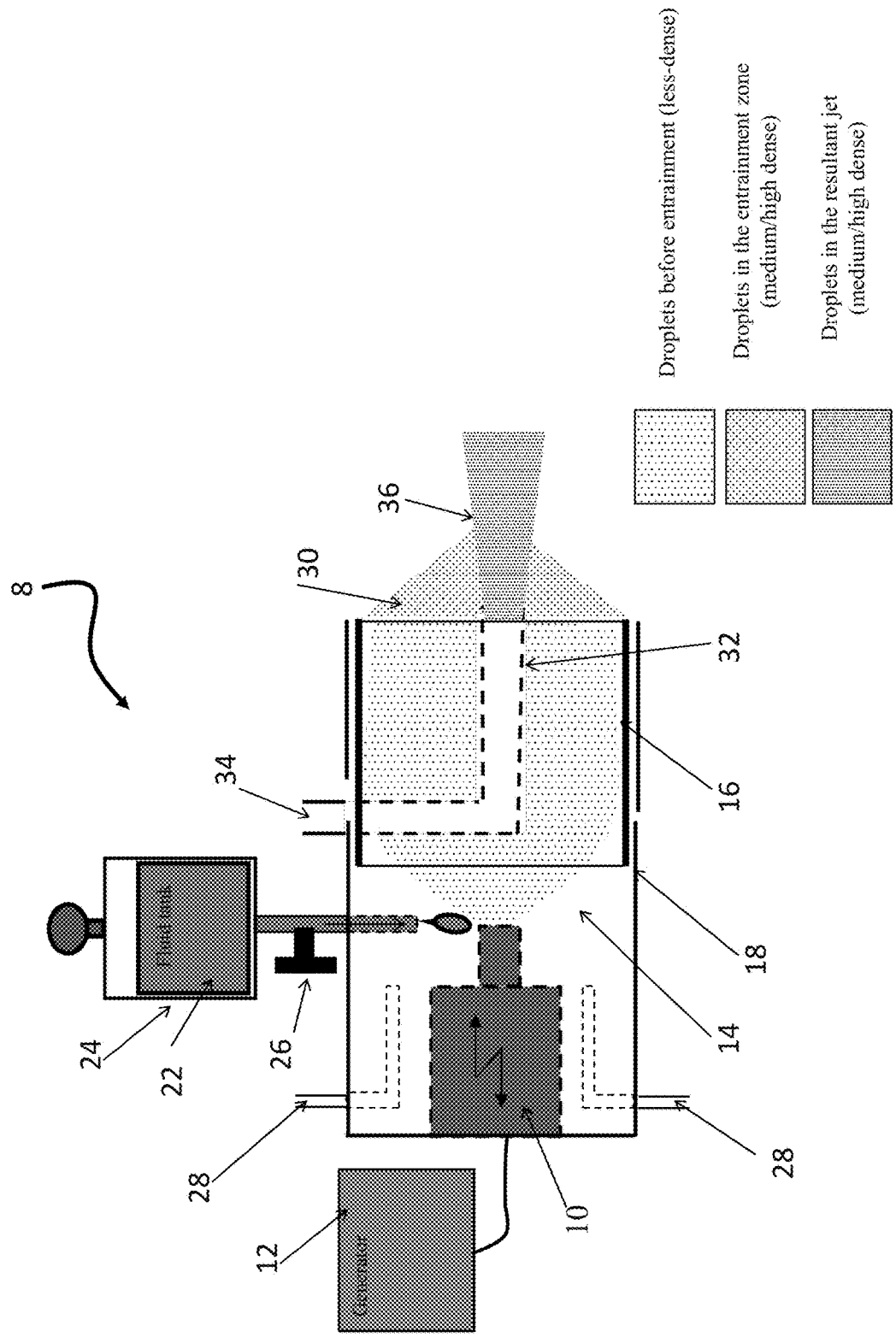
FIG. 1A is a schematic diagram of a preferred embodiment atomizing cutting fluid system of the invention.
Figure 1B:
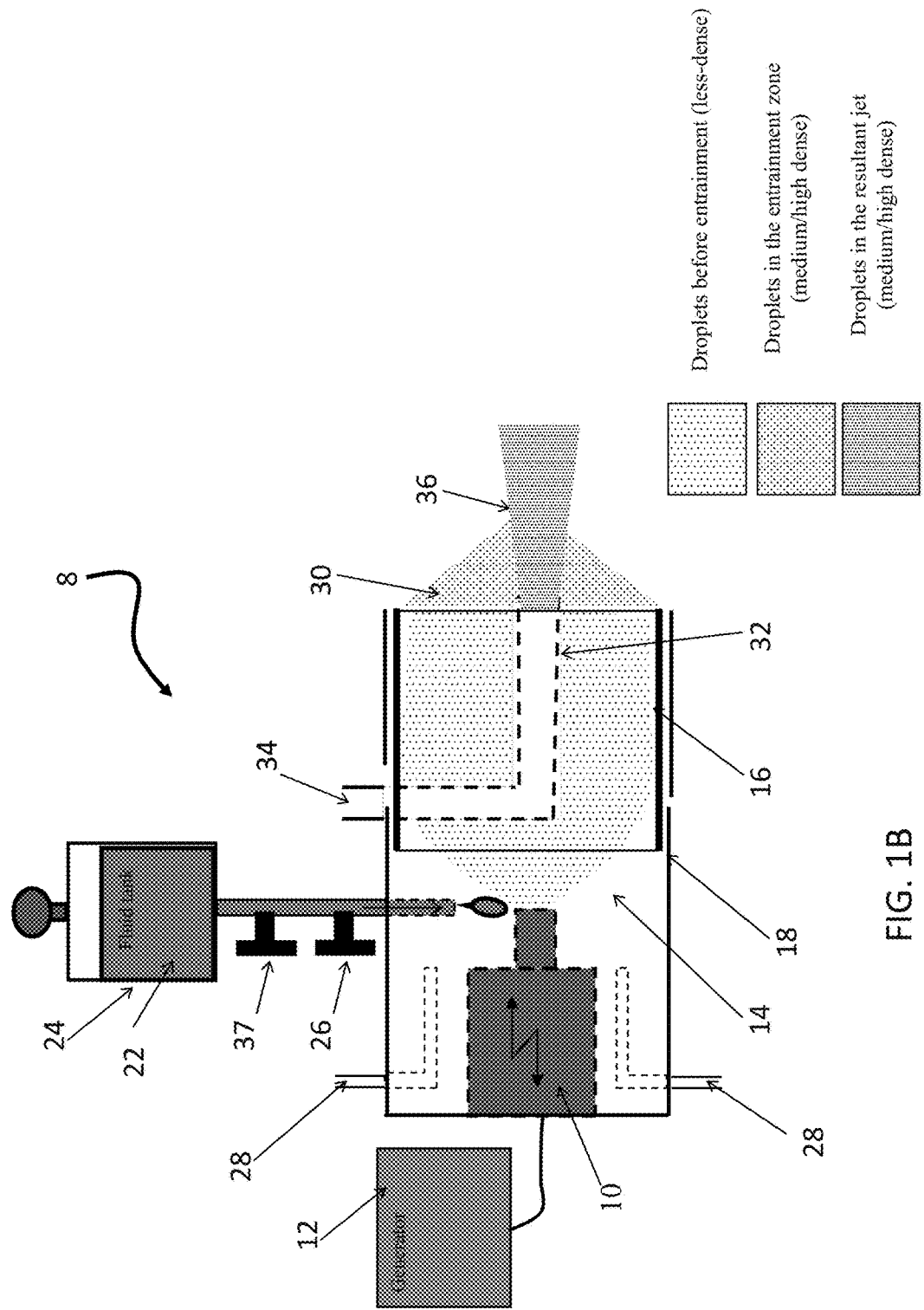
FIG. 1B is a schematic diagram of a preferred embodiment atomizing cutting fluid system of the invention.
Figure 1C:
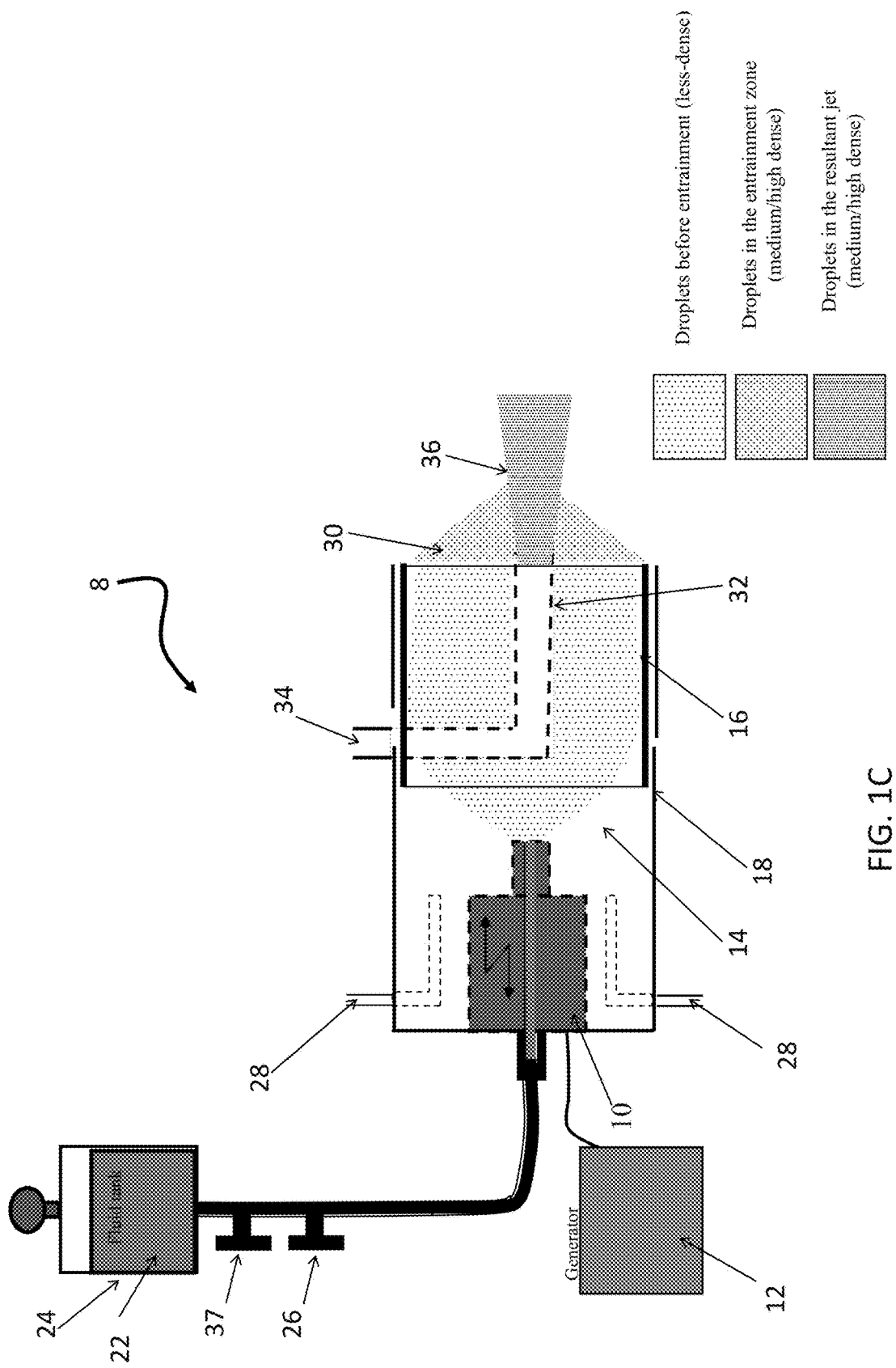
FIG. 1C is a schematic diagram of a preferred embodiment atomizing cutting fluid system of the invention.
Figure 2:
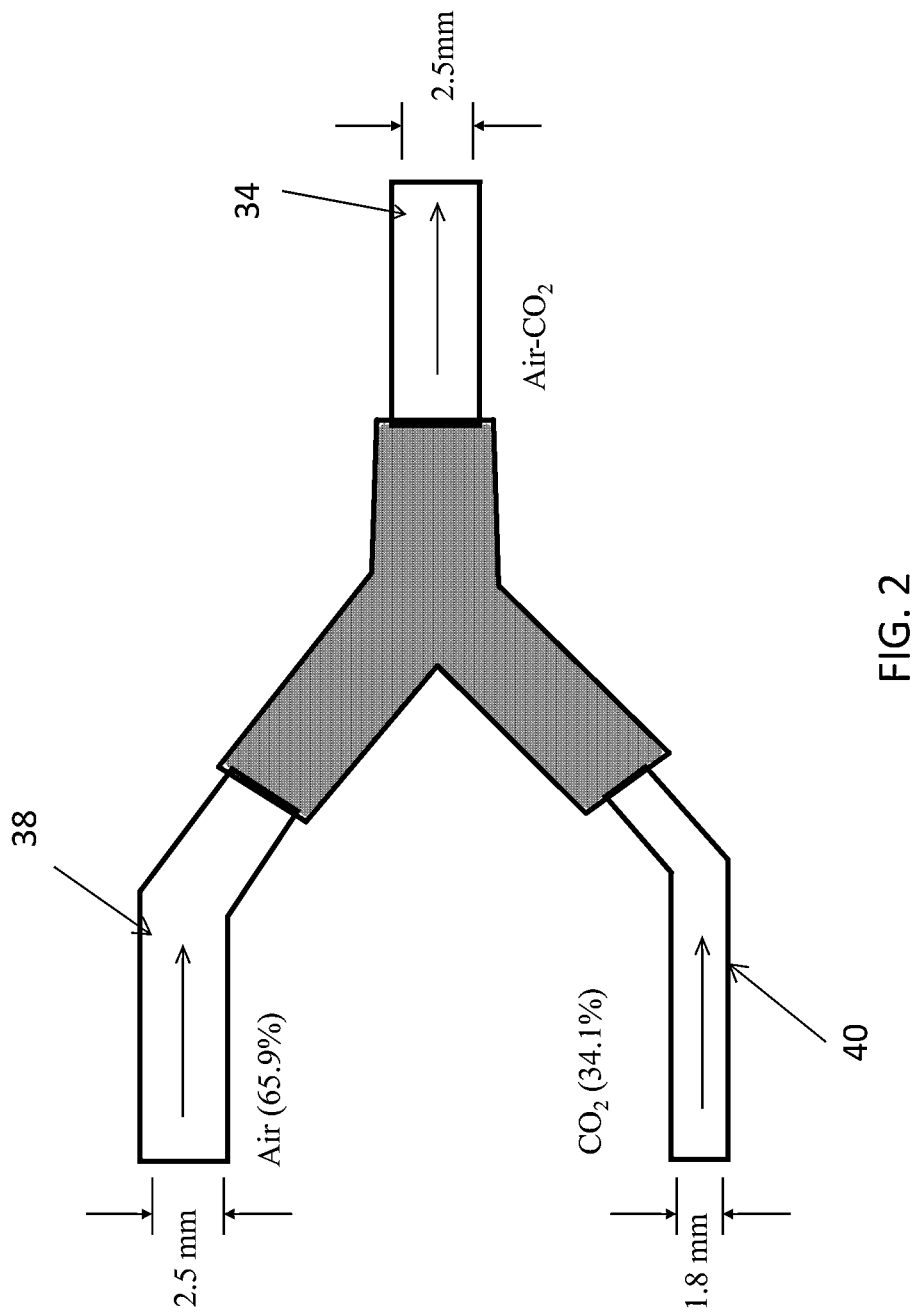
FIG. 2 illustrates a preferred example embodiment mixing section for the high-velocity gas inlet of the systems of FIGS. 1A-1C along with example dimensions to illustrate preferred example ratios to control respective volumetric pressures and flows of air and $CO_2$.
Figure 3:
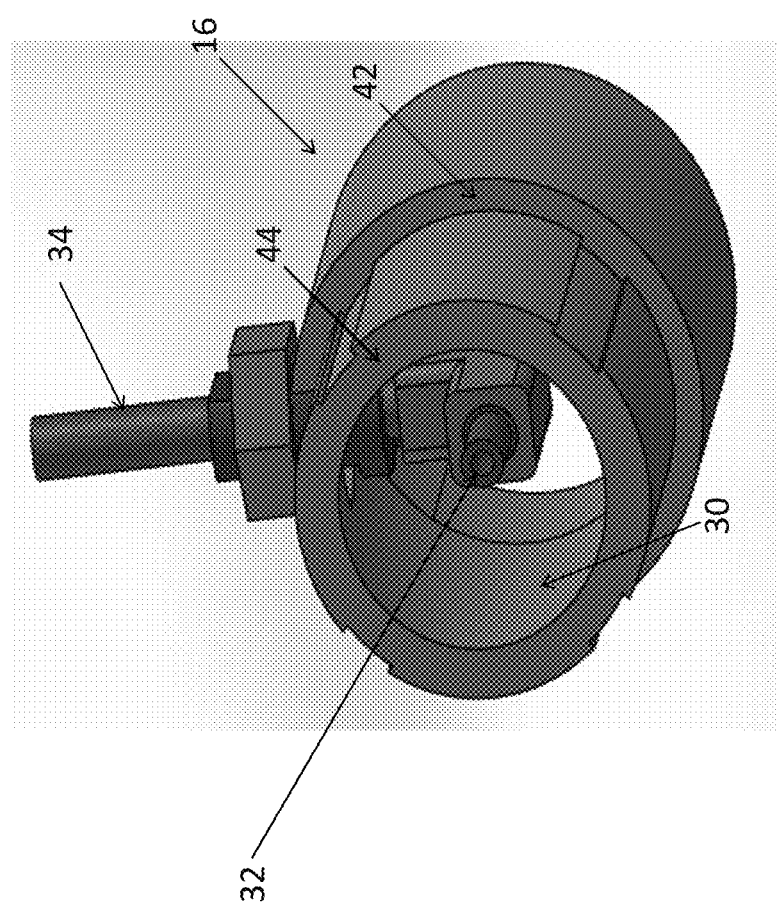
FIG. 3 is a partial perspective view of the nozzle section of the system of FIG. 1A.

The present inventors have determined that a limiting factor of flow rates in previous ACF spray systems for micro-machining is the delivery of atomized fluid droplets from outside of the chamber, typically by a long pipe into the machine chamber. This limits the flow rate to about 1-2 mL/min from the outside of the machine chamber to the inside. See, e.g., Jun, M. B. G. et al., "An experimental evaluation of an atomization-based cutting fluid application system for micromachining," ASME Transactions, Journal of Manufacturing Science and Engineering, 130: 0311181-8 (2008). Others have also studied ACF for micro machining. See, e.g., Rukosuyev, M. et al., "Understanding the effects of system parameters of an ultrasonic cutting fluid application system for micromachining," Journal of Manufacturing Processes 12/2: 92-98 (2010). One problem that the present inventors have recognized is that it is difficult or impossible to deliver droplets from outside at higher fluid rates, e.g., 10-20 mL/min that are required for macro-scale machining due to droplet-droplet and droplet-wall interactions.

Reduced film thickness and faster droplet spreading with increasing jet pressure has been investigated in the context of lubrication of internal combustion engines. See, e.g., Stanton & Rutland, "Multi-dimensional modeling of thin liquid films and spray-wall interactions resulting from impinging sprays," International Journal of Heat Mass Transfer, 41: 3037-3054 (1998). Others have studied lubrication and confirmed that lubrication will be effective when there is a stationary surface and a moving surface with a film in between. See, Langlois, W. E., "A Wedge-Flow Approach to Lubrication Theory," Quarterly of Applied Mathematics 23:39-45 (1965).

After a certain level of jet pressure, higher incident velocity is induced and will result in droplets splashing instead of effectively spreading upon impingement. See, Yarin & Weiss, D. A., "Impact of drops on solid surfaces: self-similar capillary waves, and splashing as a new type of kinematic discontinuity," Journal of Fluid Mechanics, 283: 141-173 (1995). The impingement angle with respect to the base surface (i.e. tool rake) defines the regime for sticking the droplets, otherwise, partial rebound or split deposition will take place. Chen & Wang, "Effects of tangential speed on low-normal-speed liquid impact on a non-wettable solid surface," Experiments in Fluids 39: 754-760 (1995). The droplet loses its initial kinetic energy or momentum after impingement with increase in impingement angle resulting in a weak film pressure. Jayaratne & Mason, B. J., "The coalescence and bouncing of water drops at an air/water interface," In Proc. of the Royal Society of London. Series A, Mathematical and Physical Sciences, 280: 545-565 (1964). Others have recognized that the spray distance controls the diffusive nature of the spray over the travel distance. Rukosuyev, et al. "Understanding the effects of system parameters of an ultrasonic cutting fluid application system for micromachining," Journal of Manufacturing Processes 12/2: 92-98 (2010).

The present inventors have also recognized other limiting factors of prior micro-machining efforts. Limiting factors include heat created during machining, which results from shearing of the metal by the cutting edge on the primary shear plane, and from friction at the tool-chip interaction. Effective penetration of the cutting fluid in the cutting zone is essential for longer tool life. In micro-machining, the wetting and penetration of the cutting zone by the fluid droplets is easier because the machining parameters, e.g., depth of cut and feed rate are comparable to the droplet size (e.g. 10-50 µm) produced from the atomizer. Macro-machining has a tool-chip contact area that is much larger than droplet size, which renders the atomization-based cutting fluid spray techniques used in micromaching ill-suited for achieving penetration. Achieving effective penetration of a spreaded fluid film throughout the cutting region is important in order to provide both cooling and lubrication effects. These effects are closely related to the resulting film thickness, its pressure (i.e. lift force) between the tool and the chip, and its cooling coefficient and tribological effect.

Embodiments of the invention include systems and methods for producing a thin film of an atomization-based cutting fluid spray that can provide cooling and lubrication between a workpiece and a cutting tool during machining. Systems and methods of the invention create a thin film of micro-scale fluid droplets and direct that film to the cutting zone to improve cutting dynamics and cooling. Methods and systems of the invention are safer than high pressure and cryogenic techniques, as preferred systems of the invention can use a gravity supply for a fluid tank. Spray is created with a small amount of fluid that is delivered efficiently as a thin film.

Preferred embodiment methods and systems of the invention are also environmentally friendly. $CO_2$ is used in preferred systems for its excellent cooling processes, while the systems of the invention avoid the need to provide high pressures. Systems of the invention mix $CO_2$ with air in specific ratios and a mixing flow that is optimized. Pressure demands are reduced compared to prior systems that are disfavored for their use of pure $CO_2$. Other inert gases with similar molecular weights, and particularly molecular weights above that of $O_2$ (molecular weight 32) can be used. Argon (~40) is another option. An additional benefit of $CO_2$ is that it is inexpensive. Its recycling into preferred processes of the invention also provides an environmental benefit.

A preferred system of the invention includes an ultrasonic-based atomizer and a gravity-fed cutting fluid reservoir with a delivery tube. A nozzle section includes high-pressure gas delivery nozzle/tube at the nozzle-spray unit. The nozzle is configured to produce an axisymmetric co-flow jet produced of a high-velocity gas and micro-scale fluid droplets. A flow evolution downstream position pattern is created to deliver a thin film at a tool-workpiece interface. Mixing tubes mix air and $CO_2$ in a common flow to produce a temperature that avoids formation of ice from water mixed in the concentrated cutting fluid. Delivery tubes are sized to maintain the same pressure for the different feeds.

Preferred systems of the invention can rely upon a gravity feed, which avoids many safety hazards and design difficulties associated with high pressure systems. No pump is required to deliver cutting fluid. Gravity feed of cutting fluid is possible, because preferred systems of the invention utilize a very small amount of cutting fluid, e.g., up to 0.167 L/min, as compared to conventional flood coolant, e.g., 1 L/min or above, during machining at the macro-scale. With cutting fluid usage that can be a tenth or less of the fluid used by flood systems, similar or better tool life and performance is achieved.

As the high-velocity gas, the present system utilizes significant amount of $CO_2$ from pressurized cylinder along with air. $CO_2$ helps to reduce the dispensing temperature as well as suppressing smoke from the cutting zone. Smoke from burning cutting fluid is usually seen during machining with air alone or $N_2$ gas. Any inert gas alone or mixed with air could be applied for reducing the dispensing temperature of the spray. However, the molecular weight or molar mass plays a vital role in diminishing smoke from the cutting zone that is produced due to burning of cutting fluid. For example, $N_2$ (molecular weight 28) was tested and produces undesirable smoke. With its higher molecular weight than that of $O_2$ (32), $CO_2$ (44) helps in diminishing the smoke by forming a blanket around the burning fluid and also by displacing the oxygen surrounding the fluid. For this reason, other high molecular weight inert gases, e.g. Ar (~40), can also be used.

A preferred system of the invention includes an ultrasonic atomizer controlled by a generator. The exit delivery portion of the atomizer should be with the common chamber, however. The atomizer is within a common chamber immediately proximate and behind a nozzle section of the chamber. Cutting fluid is provided to the atomizer from a gravity feed tank. If required, low velocity air inlets may be used to help flow from behind the point where the cutting fluid is introduced. The atomizer creates droplets in a volume contained by a nozzle chamber. High-velocity gas is introduced from mixing unit that mixes air and $CO_2$ to entrain the droplets in an entrainment zone at the outlet of the nozzle. Surrounding fluid droplets are entrained by a high-velocity center gas jet at the droplet nozzle outlet. The high-velocity center gas jet nozzle is co-axial with the chamber and the droplet nozzle.

In preferred embodiments, droplet velocity and gas velocity are set to produce a droplet-gas co-flow with a core that focuses and produces a thin film at a predetermined, and preferably optimized, distance from the nozzle when contacting a workpiece-tool interface. A preferred example embodiment suitable for macro-machining of titanium alloys is configured to produce a combination of a 1.2 m/s droplet velocity and 26 m/s gas velocity (at 35 mm distance from the gas nozzle) with a droplet spray behavior in terms of droplet entrainment angle and droplet density across the jet flare that provides a thin film. The fully-developed region (i.e., self-similarity state) of the co-flow is at about 26 mm spray distance from the nozzle or above for the present gas nozzle exit diameter of 1.6 mm. This configuration has been demonstrated to produce a uniform thin fluid film for penetrating at the cutting interface. In preferred embodiments, dimensions and spray parameters are set to achieve a droplet entrainment angle in the range of 20-30°.

A preferred example embodiment nozzle for the system includes a convergence of 4° for the droplet nozzle, which ensures atomized droplets can be entrained with the high-velocity gas. For the preferred example, a convergence angle of 0.75° and exit diameter of 1.6 mm for the gas nozzle were determined to develop the droplet-gas co-flow in self-similarity state before the spray impinges at the cutting zone within a feasible spray distance range (e.g., 25-40 mm) during machining. Operated with a combination of 1.2 m/s droplet velocity and 26 m/s gas velocity (at 35 mm distance from the gas nozzle), this produced a fully-developed region (i.e., self-similarity state) of the co-flow at and after 26 mm spray/downstream distance when the exit diameters of the gas nozzle and the droplet nozzle are set 1.6 and 18.8 mm, respectively. This provides a ratio of the downstream distance to the gas nozzle exit diameter at 16 or above. Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Referring now to FIG. 1A, a schematic representation of a preferred cutting fluid system 8 of the invention is shown. The system includes an ultrasonic atomizer 10 that is controlled by a generator 12 to operate at resonant frequency at the tool tip. The atomizer 10 is held (or fit) within a common chamber 14 immediately proximate and behind a nozzle section 16 of the chamber 14. The chamber 14 can be formed by a unitary or multi-piece cover/enclosure 18.

Cutting fluid 22 can be fed at the tip of the atomizer 10 from the delivery tube or from the behind through the body center of the atomizer 10, depending on its design. Cutting fluid 22 is provided to the atomizer from a gravity feed tank 24, with flow being controlled by a valve 26. In experiments, this was controlled manually, but can be automated. Measurements can provide feedback to a control system to control the flow of the cutting fluid according to tool operation. Advantageously, this feed is low pressure and requires no pumps or power. This enhances safety, reduces system complexity and reduces power consumption compared to many conventional systems. Low velocity air inlets 28, if required, provide air flow from behind the point where the cutting fluid 22 is introduced, which keeps the droplets dispersed and flowing toward the droplet nozzle 16 for entrainment. In one set of experiments the low velocity air inlets were used since the atomized droplets flowed at a low rate of 0.2 m/s. The low velocity air inlets can be used to increase this velocity. In other experiments, an atomizer atomized at a rate of about 20 mL/min, and the low velocity air inlets 28 were omitted. In the additional experiments, the chamber 18 was modified to control air entrapping. The modifications in this additional experiment omitted the four air inlets 28 on the periphery of the chamber 18, eight small holes (3 mm diameter) at equal distance were made at the same periphery location. Eight additional holes were formed in the backside of the chamber 18. These additional holes were located between the atomizer 10 and the chamber outer diameter point, and were equal spaced in the radial direction.

FIG. 1B illustrates a system that is similar to FIG. 1A. The FIG. 1B system adds a second valve 37, that serves as a cut-off valve. With this arrangement, the valve 26 serves as a flow-rate valve and can be set and left at a predetermined flow rate while the cut-off valve permits turning flow on and off. The valve 26 can be adjusted to precisely control the flow rate or be set at a particular flow rate, while the valve 37 permits a quick stop of the flow. Preferred cut-off valves include gate and butterfly valves, while the valve 26 is preferred to be globe type.

FIG. 1C illustrates a system that is similar to FIG. 1B. The FIG. 1*c* system delivers cutting fluid through the body of the atomizer 10 instead of in front of (downstream) of the atomizer. Other parts of the system are the same, but the system of FIG. 1C can be easier to assemble as careful alignment of the fluid outlet at the tip of the atomizer 10 is not required.

In each of the systems of FIGS. 1A-1C, the atomizer 10 creates a low-velocity droplet spray from the cutting fluid within the chamber that is then entrained in an entrainment zone 30 of the nozzle section 16 by high-velocity gas emitted from a high-velocity gas nozzle 32 fed from a high velocity gas inlet 34. Surrounding fluid droplets are entrained by a high-velocity center gas jet at nozzle outlet of the high velocity gas nozzle 32. A focused atomized spray 36 is produced at a predetermined distance from the end of the nozzle section 32 and can create a uniform thin film at a workpiece-tool interface during operation.

In preferred embodiments, the high-velocity gas includes a substantial amount of $CO_2$, but in a low enough ratio to avoid formation of ice at the outlet. In preferred embodiments the mixture achieves a spray temperature of about 2° C. This temperature is selected to be slightly above the freezing point (0° C.) of water to avoid freezing. A range of ~1-4° C. is preferred to avoid freezing while maintaining a desirable cooling effect. High-velocity gas is introduced from mixing unit that mixes air and $CO_2$ to entrain the droplets in an entrainment zone at the outlet of the nozzle and produce the resultant jet spray.

The micro-size fluid droplets in the resultant jet spray are focused at a predetermined distance that permits direction of the spray at a workpiece-tool interface to create a uniform thin film. Rather than relying upon an excess of fluid (i.e., flooding), the thin film is efficiently delivered and penetrates the interface to cool and lubricate the work zone and tool.

Upon impingement, the spray-surface interaction results in one of the four regimes: sticking, rebounding, spreading, and splashing, which can be determined based on the non-dimensional Weber number, We($=\rho u_o^2 d_o/\sigma$), and a non-dimensional group, $K_y(=u_o(\rho/\sigma)^{1/4}(\rho/\mu)^{1/8}f^{-3/8}$, where, $d_o$ is the droplet diameter, $u_o$ is the normal component of the droplet velocity, $\rho$ is the liquid density, $\sigma$ is the liquid surface tension, $\mu$ is the liquid dynamic viscosity, and f is the frequency of the droplets impact. The spreading regime ($We \geq 10$ and $K_y \leq 17$) is desired for effective wetting of the cutting zone, as has been recognized by others, but others have typically relied upon flooding in an effort to provide effective wetting. The FIGS. 1A-1C systems instead produce the resultant spray of very small droplets that achieves a uniform thin film.

FIG. 2 illustrates a preferred example embodiment mixing section for the high-velocity gas inlet 34. Example dimensions (diameters of feed pipes 38 and 40) are shown in millimeters to illustrate ratios set to control respective volumetric pressures and flows of air and $CO_2$. $CO_2$ cools to a significantly lower temperature as compared to air or $N_2$, when sprayed out of a nozzle from a pressurized tank. For example, when released from cylinders, the temperature of the $CO_2$ gas is measured to be about −25° C. and −5° C. at 300 psi and 150 psi, respectively, whereas it is about 18-20° C. for $N_2$ gas and air regardless of the pressure level. Therefore, compared to air and $N_2$, $CO_2$ gas is expected to provide more cooling. In addition, $CO_2$ gas is an industrial byproduct that can be recycled during machining. However, the water-mixed fluid droplets that come through the outer droplet nozzle will immediately form ice at the outside body and the outlet of the high-velocity gas nozzle due to such lower temperatures of $CO_2$ gas if pure $CO_2$ is used. As ice continuously forms, its size becomes large and it blocks the fluid droplets. The mixing arrangement avoids this problem, in the preferred example. The preferred example was tested experimentally with about 66% air and 34% $CO_2$ gas by volume mixed in the same flow line 34 and the resulting temperature was measured to be about 2° C. during testing. The size of the delivery tubes 38 and 40 for these two gases were varied to maintain this volumetric ratio while maintaining the same pressure level.

FIG. 3 is a partial perspective view of the nozzle section 16. A housing 42 forms at its terminal end a droplet nozzle 44 of the nozzle section 16. The high-velocity gas nozzle 32 is co-axial with the droplet nozzle 44 and the nozzle section 16 housing. The inner diameter of the droplet nozzle provides a converging profile on its inner surface (best seen in FIG. 4) that promotes focusing. In an experimental device, the housing 42 and nozzle 44 were formed separately and joined together, but this can also be a unitary structure. In an experimental device, the housing 42 (common chamber) slide with its inner surface on the outer surface of the droplet nozzle 44, with the help of slot grooves. These two surfaces (of 42 and 44) were high precision surfaces. In the example experimental device, the convergence slope (4°) is only given in the inner surface of the droplet nozzle 44.

FIG. 4 illustrates the cross-section of the FIG. 3 nozzle section 16, along with example dimensions and slopes of the converging inner surfaces of the high velocity gas nozzle 32 and the droplet nozzle 44. In the FIG. 4 design, there is a 4° convergence with 18.8 mm exit at the droplet nozzle, ii) 0.75° convergence with 1.6 mm exit at the gas nozzle, iii) the gas nozzle exit is 5 mm inside of the droplet nozzle exit. (a, b, c, d, e can vary as convenience. In the above design, a=25 mm, b=2 mm, c=15.2 mm, d=25 mm, e=10 mm). To produce a focused and high-pressure fluid droplet jet, the pressurized gas is delivered through the high-velocity gas nozzle that adds its momentum to the droplets. The spray distance during machining can be set at relatively high values (e.g., about 30 mm) to allow for the flexibility of the nozzle unit and easy chip evacuation from the cutting zone. However, any divergence of the spray jet is undesirable. A significant amount of the fluid droplets would miss the cutting region, and the droplet jet can lose its momentum or kinetic energy towards the cutting region. Since the pressurized fluid over the spray distance gradually diffuses from its center streamline mainly due to the pressure difference from the surroundings, the gas nozzle can be optimized by changing the convergence slope ($\theta_g$) to control the momentum and the coverage of the spray jet. With the inlet and outlet diameters of the droplet and high velocity gas nozzles having a convergence slope, $\theta_m$ of about 4° and $\theta_g$ of about 0.75°, respectively, as described, for a given spray distance of about 25 and 35 mm, the diameters of the spray jet will be about 0.95 and 0.68 mm, respectively. These sizes of the spray coverage provided coverage of the cutting region during titanium machining where the tool-chip contact width is less than about ~0.5 mm.

In experimental device the following were fixed dimensions: droplet nozzle: 4°±0.50 with 18.8±1 mm exit dia. Gas nozzle: 0.75±0.1° with 1.6±0.1 mm exit dia. Droplet nozzle convergence was preferred so that the droplets tend to move toward the entrainment zone. In such case, the center gas can effectively entrain the droplets. Without convergence, the droplets in the boundary diffuse with atmospheric air immediately after exiting from the droplet nozzle as the high-velocity gas cannot effectively entrain the droplets that are comparatively at a larger radial distance. Artisans can adjust the fixed dimensions for particular applications, and particularly, to adjust the distance from the nozzle where a thin film is optimally created. Generally, the exit diameter of droplet nozzle should be small enough to avoid interaction with the rotating workpiece and/or stationary tool when the spray unit is set with certain spray conditions such as impingement angle, spray distance. The droplet nozzle should be large enough to avoid droplet interaction between themselves and with the inner wall surface of the nozzle. The length of the nozzle section (section 16 in FIG. 1A) in the experimental device is 30±1 mm. Generally, this length should be kept small enough to accomplish the convergence and entrainment, while also permitting the gas nozzle to be set back within the droplet nozzle with a preferred position 5±2 mm, which provides better entrainment of the droplets. A goal in preferred embodiments is to set the dimensions for a particular design to achieve a droplet entrainment angle of 20-30° and provide a droplet free core at the nozzle exit that provides gradual mixing to achieve a fully developed flow at a predetermined distance away from the nozzle exit. At the beginning the fully developed flow point, the droplet free core ends.

Figure 4:
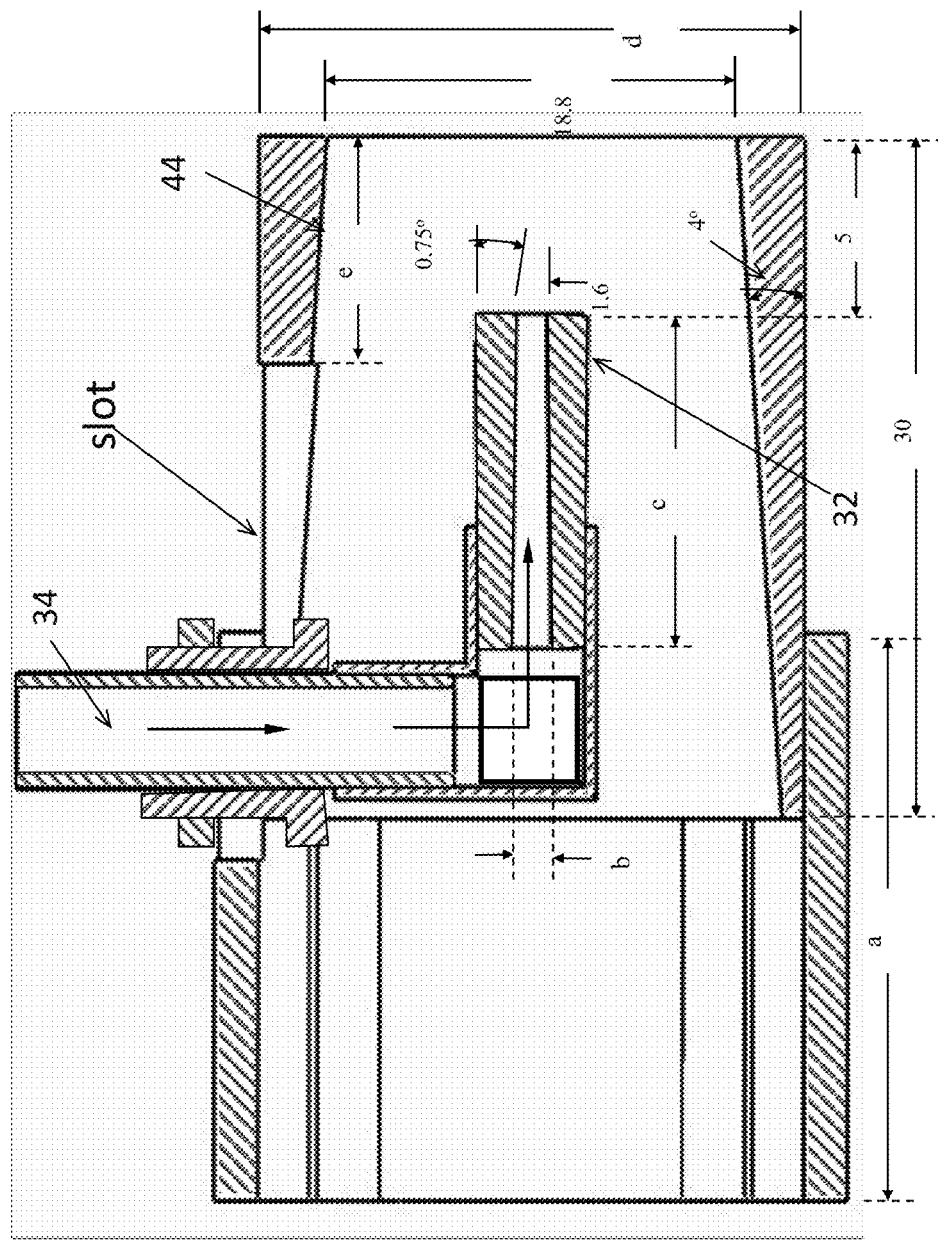
FIG. 4 is a partial cross-sectional view of a preferred nozzle section for an atomizing cutting system consistent with FIG. 1A.

Dimension Relationships in FIG. 4:

The effect of dimensions is explained qualitatively, to provide guidance to produce particular designs. The follow ing parameters can be used by artisans to produce optimal designs for particular applications.

a: Length of enclosure 18, which connects the nozzle unit with the atomizer. Atomized droplets created from the tip should have a room to spread, otherwise the droplets would directly hit/interact the backside of the gas nozzle 32. The spray pattern of the atomizer is also preferably configured to spread the atomized droplets around the high speed gas nozzle to avoid such contact.

b and c: They have a relationship as determined by the convergence of the gas nozzle. Length 'c' should be selected so that the high-velocity gas nozzle is assembled within 16. Once 'c' is selected, 'b' can be found by the convergence angle as suggested.

d: It is droplet nozzle exit dia plus the wall thickness of the nozzle. Wall thickness should be at least 1 mm. A thicker wall, however, will increase the size of the unit footprint, which may interact the rotating workpiece and/or the stationary tool for certain spray conditions used during machining.

e: Its dimension varies due to the assembly of the droplet nozzle and gas nozzle. If 'c' is selected very small, 'e' should be small for flexibility in assembly.

Experiments and Experimental Systems

Additional features and advantages of the embodiments discussed above will be apparent to artisans with reference to experiments and experimental devices that were constructed and tested, as will additional features and embodiments.

Figure 5:
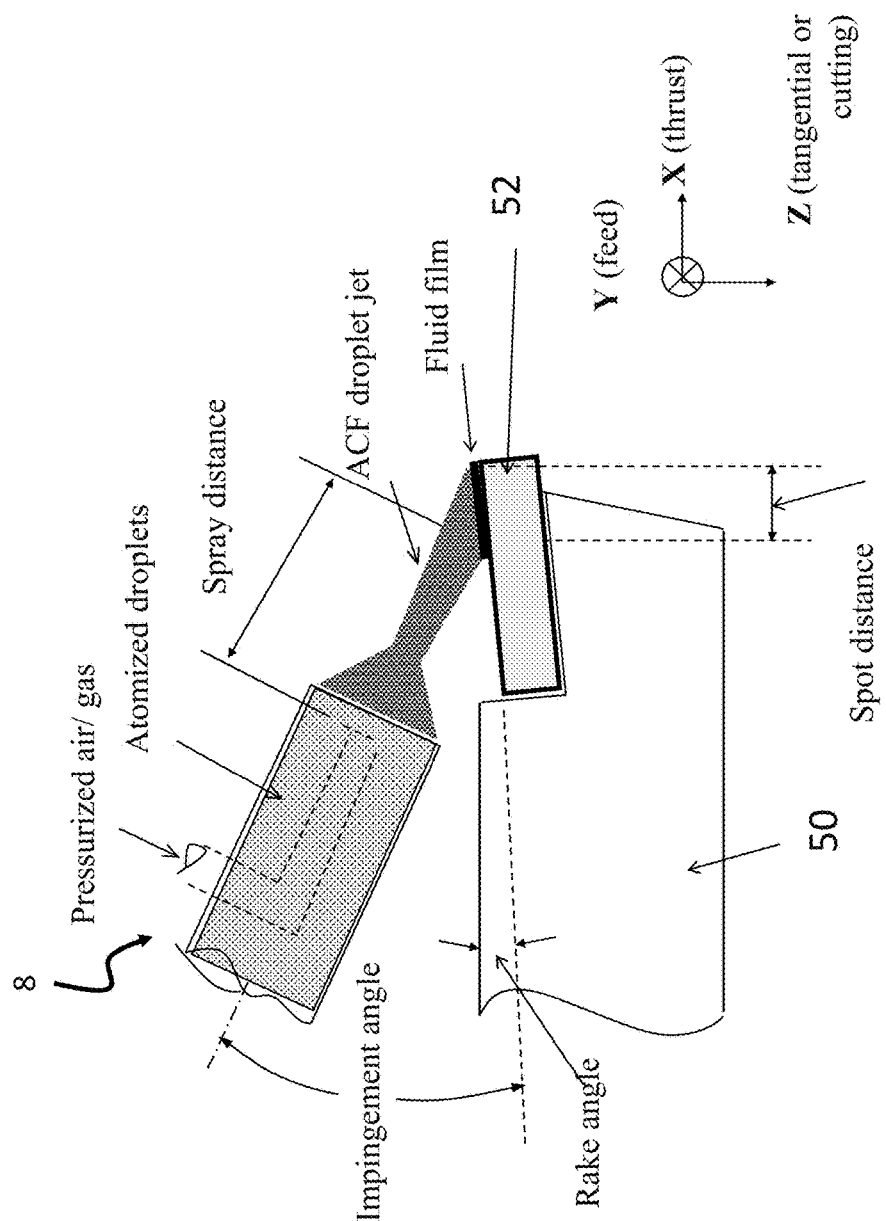
FIG. 5 illustrates an example cutting system including a cutting fluid system in accordance with the invention arranged to lubricate and cool a cutting tool/workpiece interface.

FIG. 5 shows a cutting system that includes a cutting tool system and a cutting fluid spray system 8 consistent with FIGS. 1A-4 in a set up to lubricate and cool a tool/workpiece interface. A workpiece is not shown for simplicity of illustration. The cutting tool include a tool shank 50 that holds a tool 52. FIG. 5 is labelled with parameters to that aid understanding of the testing and performance of an experimental system of the invention. Fluid film formation and its penetration, cooling and lubrication characteristics of an ACF spray system are influenced by pressure level of the droplet carrier gas and its type, fluid flow rate, droplet impingement angle, and spray distance. FIG. 5 shows the relationship between these parameters and fluid film formation.

An ultrasonic-based atomizer (Model VC5040AT from Sonic and Materials, Inc., CT) that vibrates at 40 kHz, was used in experiments to produce uniform fluid droplet size of about 50 μm at the maximum flow rate of 10 L/hr (i.e. 166.67 mL/min). The atomizer was tightly placed inside a plastic transparent cover. The generator for the atomizer was located outside the machine chamber for easy turn on/off. The cutting fluid reservoir was placed on top of the machine cover (outside the machine) so that the fluid can flow due to gravity. A fluid reservoir of 4-5 gallon size can be used to machine for 16-32 hours at a flow rate of 10-20 mL/min. A plastic tube was used to deliver the cutting fluid from the reservoir to the atomizer tip. Another four small plastic tubes were integrated with the cover behind the atomizer tip for supplying the low-velocity air that assist in pushing the droplets through the nozzle unit.

The spray unit was placed inside the machine chamber (e.g. attached with the lathe turret). The nozzle spray unit was placed in front of the atomizer tip at a distance about 30 mm and tightened inside the other end of the plastic cover.

Machining Experiments

The inventors have determined that the wetting of the entire tool-chip contact zone directly depends on the fluid flow rate. The inventors have also determined that type of the droplet carrier gas can play a significant role in reducing the temperature of the cutting zone, and preferred embodiments use air and $CO_2$ to reduce the cutting zone temperature.

Figure 6:
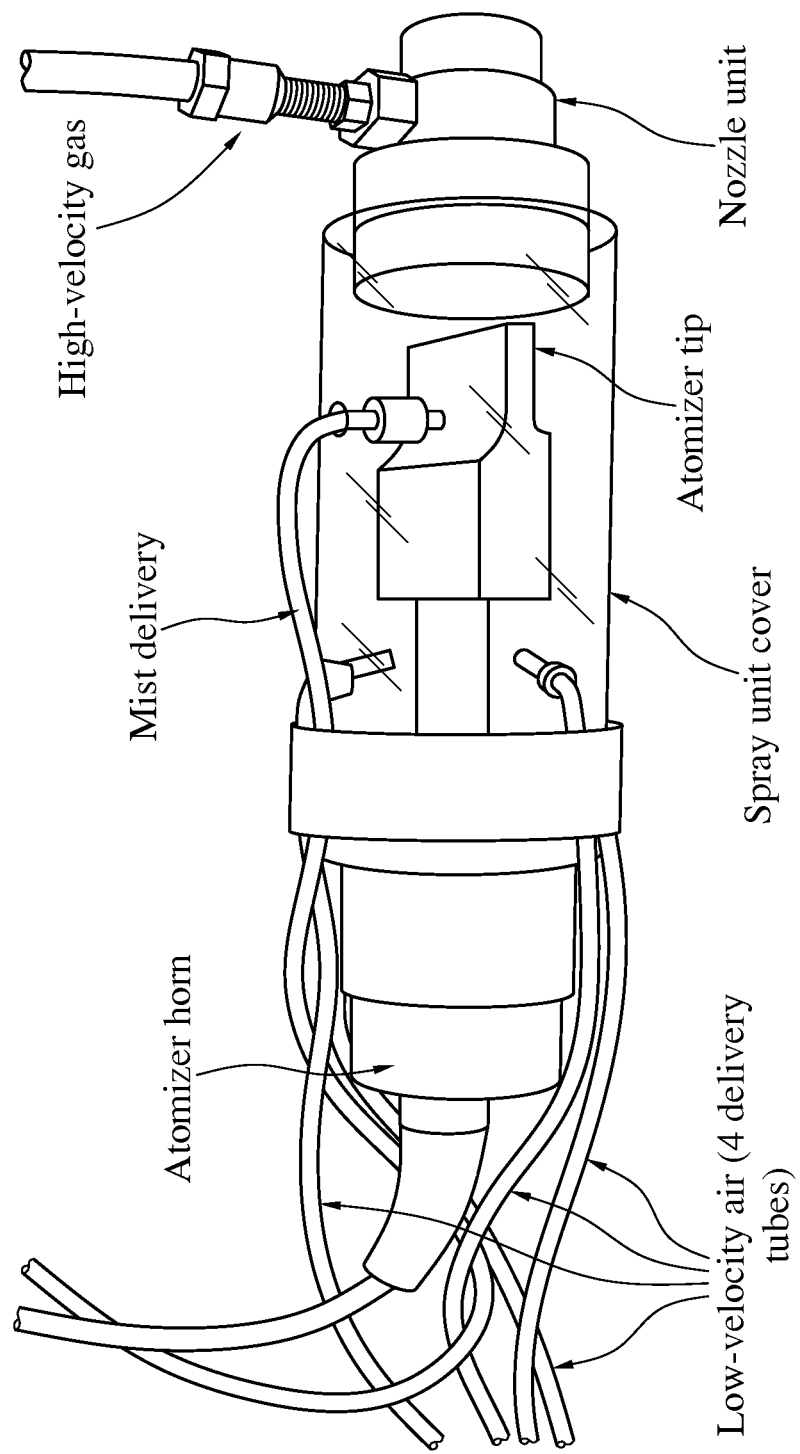
FIGS. 6-7B illustrate an experimental set-up used to test a cutting system and cutting fluid system of the invention.
Figure 7A:
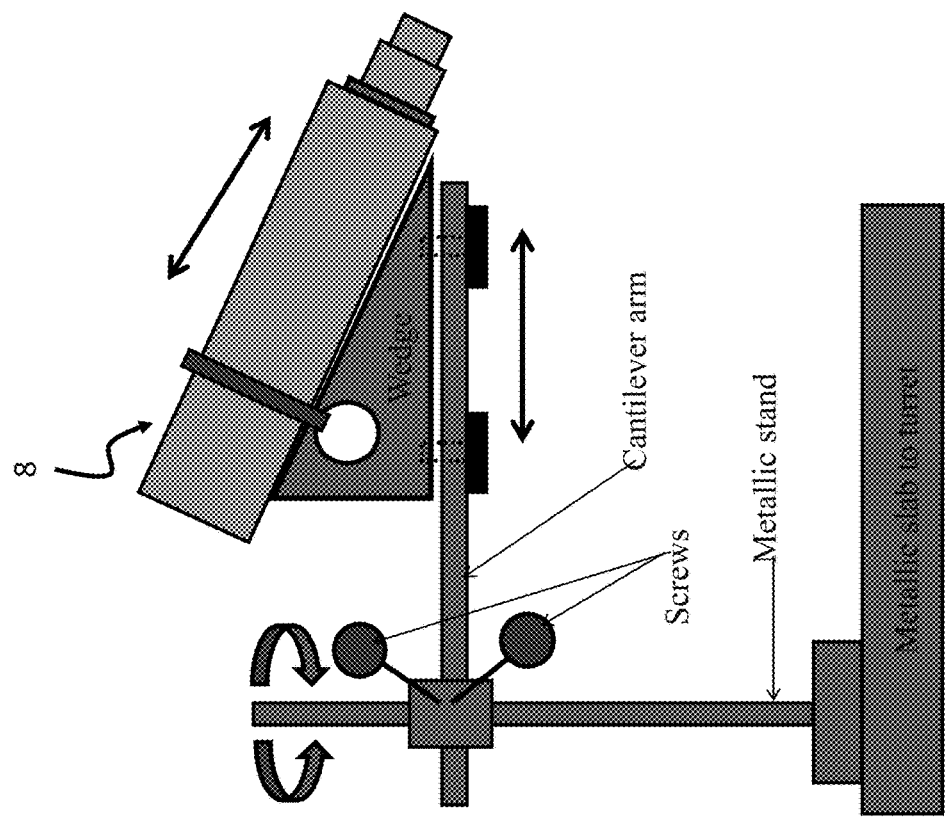
Figure 7B:
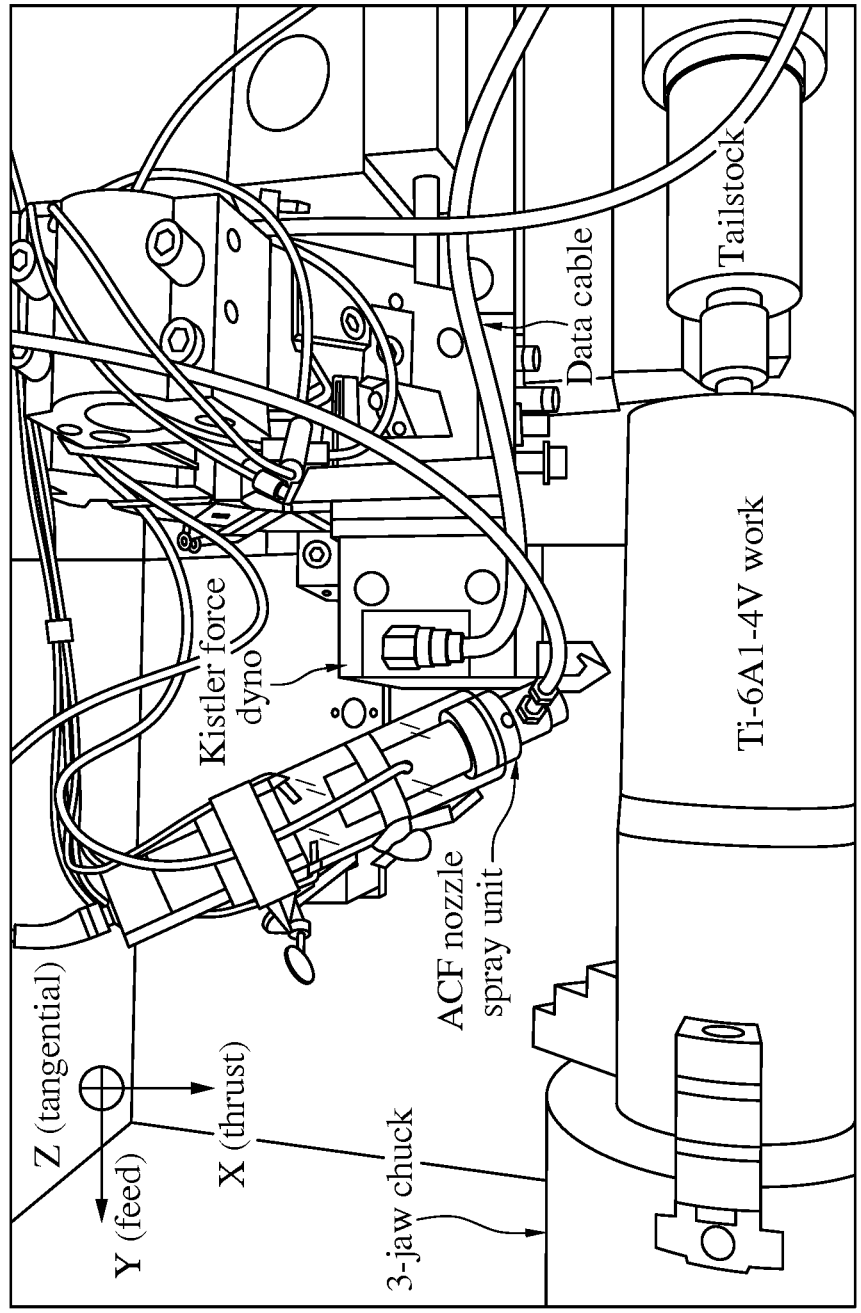

In the Experiments, a Mori Seiki Frontier L-1 CNC lathe was used for turning experiments. The experimental arrangement is pictured in FIGS. 6, 7A, and 7B. The experimental frame was constructed considering two linear axes, a rotational axis and a replaceable wedge (depends on desired impingement angle) so that the atomic cutting fluid spray unit of the invention 8 can easily be adjusted at a desired impingement angle, orientation, and spray and spot distances. FIG. 6 shows the spray system, 7A depicts the schematic of the frame and FIG. 7B shows an image of the machining set-up with the frame. The free end of the metallic slab of the frame was fastened with the lathe turret, as shown in FIG. 7C. The spray unit was directed on the tool rake face and its centerline was oriented along the major cutting edge (i.e. 60° with the work axis) for impinging the droplets in the direction of the cutting edge.

A cylindrical Ti-6Al-4V bar of size Ø175 mm×350 mm was used for turning. Triangular type uncoated microcrystalline carbide inserts ISO grade K313 from Kennametal (TPGN220408) was used as tool material. The tool geometry was set as follows: 5° rake angle, 11° clearance angle, 60° major cutting edge angle, 0.8 mm nose radius. The tool was placed with a standard Kennametal shank, which was then secured with a Kistler 3-component force dynamometer (type 9121) to capture the cutting force data at a sampling frequency of 1 kHz through a National Instrument data acquisition system (SCB-68) integrated with the LabVIEW software. Water-soluble cutting fluid S-1001 at 10% dilution was used as coolant. The thermo-physical properties of water and 10% S-1001 are presented in Table 1. Cutting fluid with higher viscosity and lower surface tension was found to be preferable for better lubricity.

A $2^{5-1}$ fractional factorial design was employed in conducting experiments. Table 2 lists the factor levels chosen for investigating the effect of five ACF spray parameters, i.e., fluid flow rate, spray distance, impingement angle, type of mist carrier gas and its pressure. The range of the fluid flow rate 10-20 mL/min and the pressure level 150-300 psi were selected to induce the spreading regime ($W_e \geq 10$ and $K_y \leq 17$) on the rake face. The velocity of the mist carrier gas, $v_g$ in the gas nozzle was estimated to be about 26 m/s at 150 psi and 36 m/s at 300 psi when measured with an anemometer at 35 mm spray distance. Table 3 shows that spreading regime upon droplets impingement on the rake face will occur under these conditions according to the nondimensional number $W_e$ and group $K_y$. The $K_y$ values were calculated considering 50% effective flow rate because the fluid droplets were observed to be condensed about 50% during the experiment due to their interactions with the outside of the gas nozzle. The air velocity in the mist nozzle was kept fixed at 1.2 m/s. The spot distance was set fixed at about 8 mm in all the tests.

During machining with conventional flood condition, coolant was directed on the rake using a standard delivery system at the flow rate and the pressure of about 1000 mL/min and 60 psi, respectively. The cutting conditions were selected to be 80 m/min cutting speed, 0.2 mm/rev feed rate, and 1 mm depth of cut.

For all the cutting conditions, the tools were removed from the setup first at 4 min and then at 6 min to observe the progress of wear. The tool thereafter was checked every one minute until the maximum flank wear land reached 0.6 mm according to the ISO standard. The maximum tool flank wear was measured using a Quadra-Check 300 optical microscope. The produced bulk chips were photographed by a digital camera and images were analyzed.

Tests were conducted using the ACF spray system for the conditions listed in Table 2. Table 4 lists the results of cutting forces, tool life, and friction co-efficient at the tool-chip interface. The friction coefficient is calculated from the relationship between the tangential and the feed force components for orthogonal cutting. Out of 16 tests in the factorial design, 4 sets of the ACF spray conditions offer tool life of up to 10-11 min. For the same cutting conditions under flood cooling (test No. 17), the average tool life for two tests was found to be about 7 min indicating that, with the ACF spray system, the tool life can be improved up to 40-50% over flood cooling.

An analysis of the tool life data in Table 4 was done to determine the significant effects of the five ACF spray system parameters. It revealed that the machining performances of Ti-6Al-4V are mainly influenced by two-factor interaction effects involving all five variables as shown in Table 5. Therefore, the main effects of the five variables must be interpreted in together.

Figure 8A:
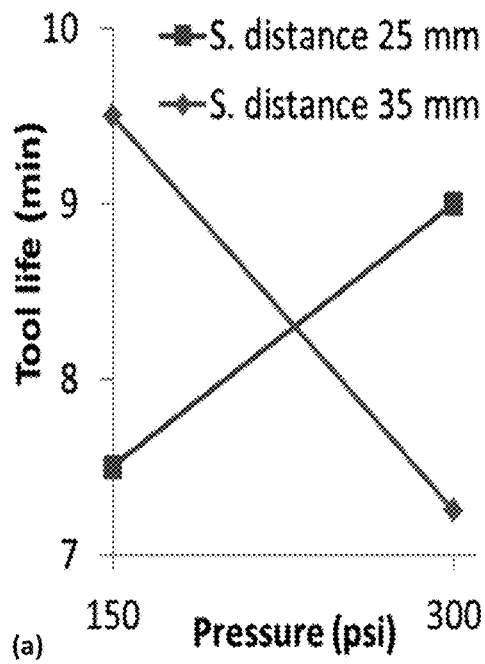
FIGS. 8A-8D are two-way diagrams for the significant two-factor interaction effects on tool life.
Figure 8B:
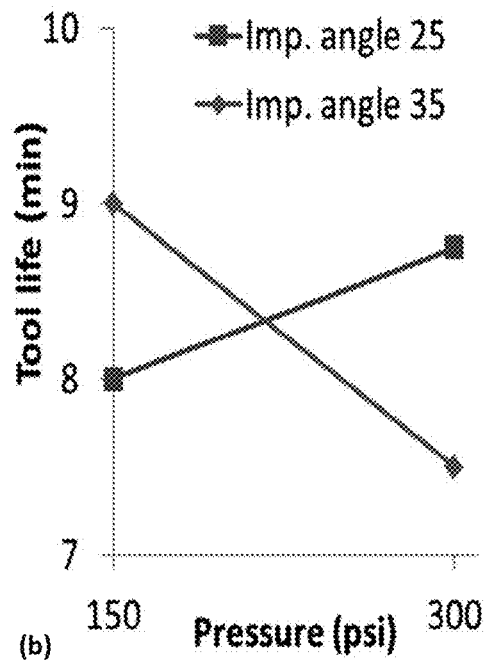
Figure 8C:
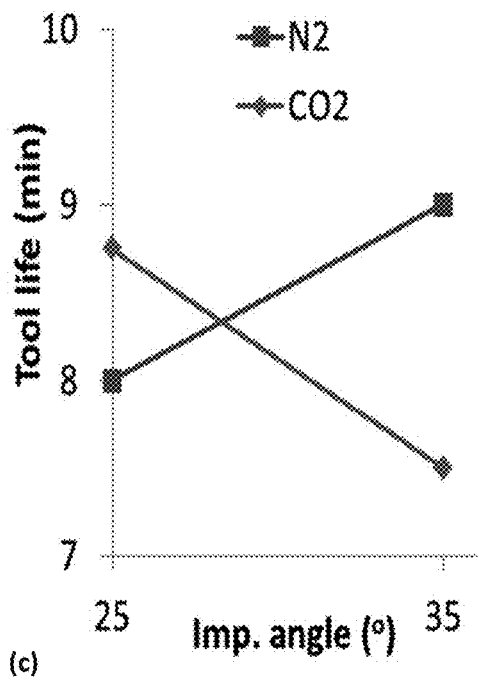
Figure 8D:
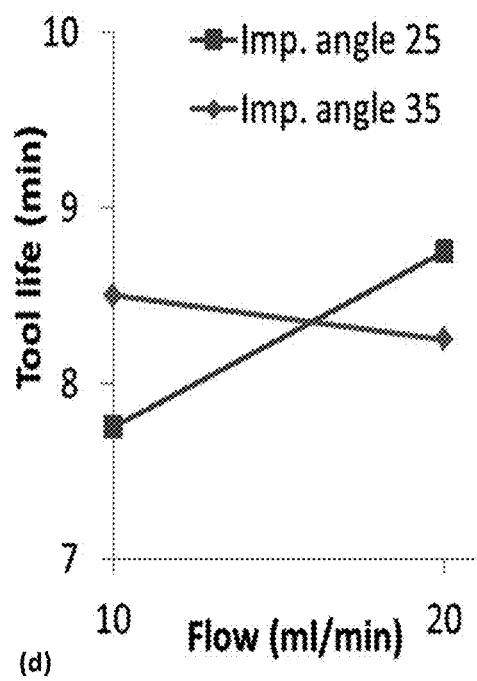
Figure 9D:
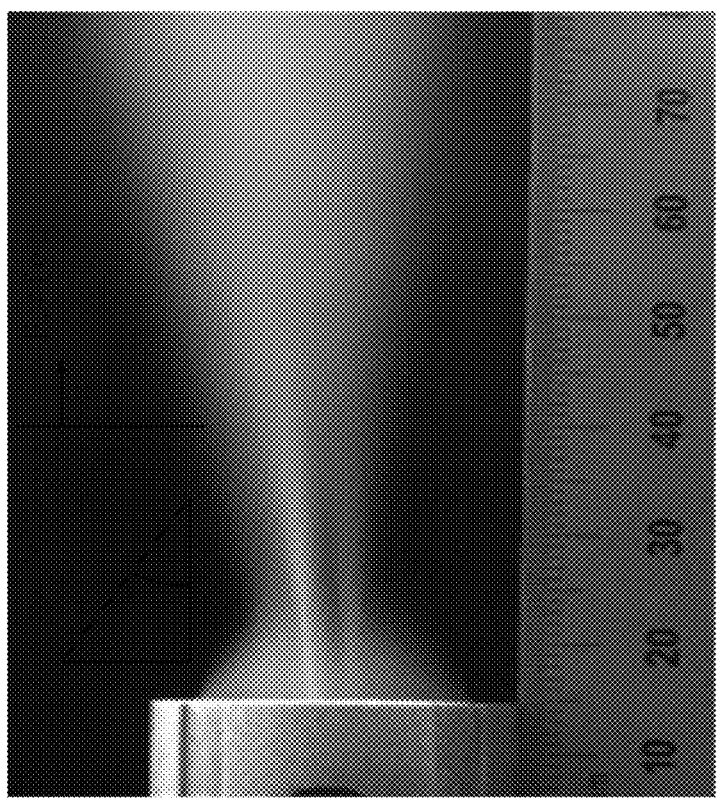
Figure 9C:
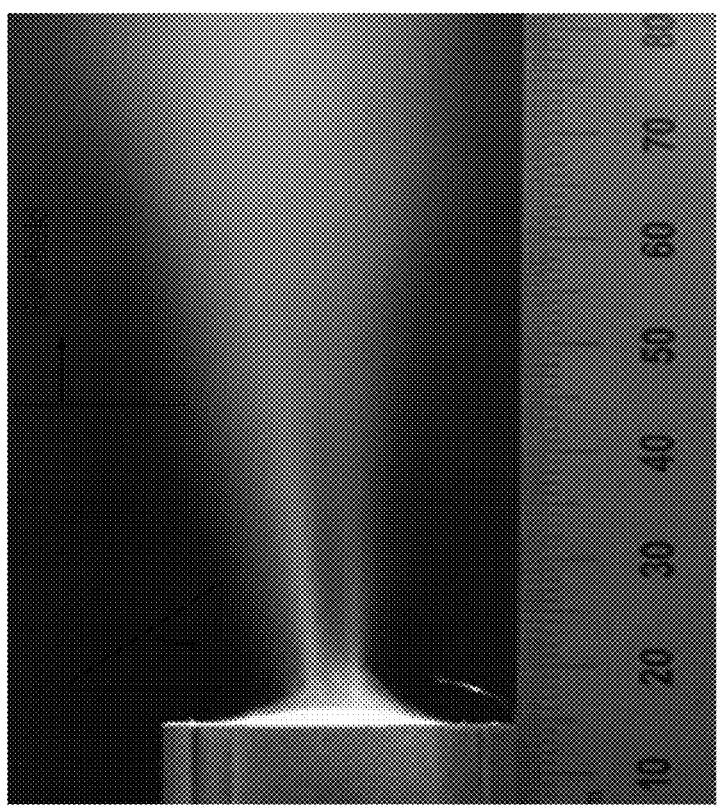
Figure 10:
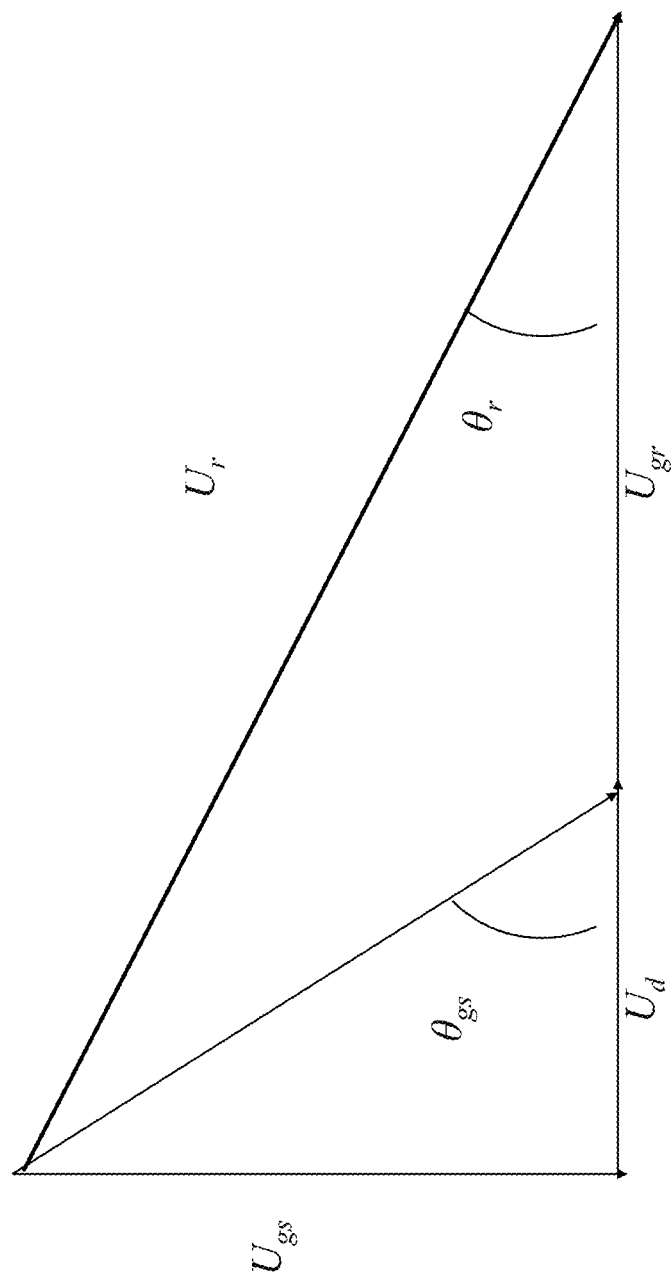
FIG. 10 is a droplet flow velocity diagram in the entrainment zone of the spray.

FIGS. 8A-8D show four two-way diagrams for the significant two-factor interaction effects on tool life. FIG. 8A shows at a long spray distance (35 mm) of the liquid droplets, the tool life significantly improves with the decrease in pressure level of the mist carrier gas, while at a short spray distance of 25 mm, the tool life tends to decrease. FIG. 8B shows that the tool life can be prolonged with the decrease in pressure of the gas at a high impingement angle. Delivery of the mist carrier gas at a low pressure (150 psi) is easier and more economical than that compared to a high pressure (300 psi) and thus this condition is preferable, and can be achieved with excellent results through the invention. FIG. 8C shows that $N_2$ gas offers longer tool life at a large impingement angle (35°), whereas air-mixed $CO_2$ offers longer tool life at a smaller impingement angle (25°). FIG. 8D shows that when the flow rate increases, long tool life can be obtained at a small impingement angle while a large impingement angle does not have significant impact on the tool life.

These results are interpreted to show that a combination of low gas pressure (or velocity), long spray distance, and high droplet flow rate for both the gases applied in an ACF spray system results in longer tool life during titanium machining. The only exception is that, to obtain a longer tool life, the air-mixed $CO_2$ gas has to be impinged at a 25° angle whereas the $N_2$ gas is at a 35° angle.

Though both the gas types offer tool life similar (about 10 min), the air-$CO_2$ mixture is preferable during machining for a number of reasons. Overall chip breakability throughout machining is higher with the use of air-$CO_2$ (90%) mixture as droplet carrier gas than with $N_2$ (40-50%). A high rate of chip breakage is preferable as broken chips are less likely to entangle and accumulate in the machining zone, and rub the machined surface. Unbroken accumulated chips also become obstacles to impinging liquid droplets leading to jet momentum reduction and reduction in the amount of fluid droplets in the cutting zone. $N_2$ gas can also cause a fire hazard during Ti-6Al-4V machining. $CO_2$ gas is inexpensive, also because it is a byproduct from industrial process, and its use in methods of the invention provides environmental benefits as the $CO_2$ gas is recycled into the process.

The tools used in two tests under flood coolant condition (test No. 17) machined for about 6 and 8 min, respectively, before failure indicating that the average tool life is about 7 min. As the nose of the tool No. 1 got chipped off after 6 min, and the wear exceeds 0.6 mm, the machining was stopped. The tools in these tests also produced heavy fire hazards and smokes due to poor penetration of the cutting fluid at the interface. Furthermore, the chips were rarely broken.

The results in Table 5 and FIGS. 8A-8D show that the combination of a low pressure gas, a long spray distance, and a high flow rate leads to a longer tool life in titanium machining. With the increase in pressure, the fluid film thickness decreases leading to a faster evaporation of the fluid before reaching the entire cutting edge. This can lead to the tool and the chip directly contacting each other, which causes higher friction. As seen in Table 4, the average values of the friction coefficient are found to be smaller when gas is delivered at a low pressure (150 psi). With the combination of a low pressure and a long spray distance (35 mm), a larger fluid film may be formed that helps in providing sufficient cooling and lubrication effects in the entire cutting zone resulting in a longer tool life (FIG. 8A). In addition, air-mixed $CO_2$ gas prolongs tool life at a small impingement angle of 25°. Since air-mixed $CO_2$ gas is preferable due to a number of advantages, a small impingement angle should be set during machining with the ACF spray system. When the flow rate increases, as seen in FIG. 8D, long tool life can be obtained at a small impingement angle (25°). This is because a comparatively higher amount of cutting fluid (20 ml/min) helps in improved wetting and spreading the fluid film over the cutting zone. A smaller impingement angle leads to comparatively higher kinetic energy (or lift force) towards the cutting region that further assists spreading the thin film.

The air-mixed $CO_2$ gas provides an initial temperature that is low (about 2° C.), which encourages formation of broken chips. The hot chips coming from the cutting zone immediately come into contact with this gas and quench at that temperature, which leads to increasing the brittleness of the chip material. At the pressure level of 150 or 300 psi, these chips are easily broken. In contrast, the initial temperature of impinging $N_2$ gas is about 18-20° C., which does not promote breaking of the chips due to the lack of brittleness.

Nitrogen gas also produced significant fire hazards in the machine zone and produces smoke. As discussed above, the higher molecular inert gases behave differently and reduce the fire hazard. The air-$CO_2$ mixture helps in diminishing the fire hazard and thus no fire hazard has been observed.

All the ACF spray system parameters such as pressure level and type of the mist carrier gas, mist flow rate, spray distance, impingement angle play significant role in the machining performances such as tool life and chip formation. For some combinations of these parameters, the ACF spray system improves tool life up to 40-50% over flood cooling as shown by the results. Though both $N_2$ and air-$CO_2$ mixture offer about the same tool life, air-$CO_2$ effectively diminishes fire hazard in the cutting zone while $N_2$ gas produces smoke by burning the mists at the elevated cutting temperature. The use of air-$CO_2$ mixture in titanium turning often produces broken chips, which do not interact with the finished surface, and are beneficial in terms of chip management. The ACF spray system of the invention is cost effective due to a significantly lower amount of cutting fluid consumption (10-20 mL/min) as compared to flood cooling (1000 mL/min or above).

Spray Experiments

Experiments were conducted using the experimental ACF spray unit to characterize droplet spray behavior. The inner gas nozzle was 5 mm inside the droplet nozzle exit position to avoid divergence of droplets. Experiments using a $2^2$ factorial design considering two gas velocities of 26 and 36 m/s, and two droplet velocities of 0.2 and 1.2 m/s were performed to study the effect of droplet velocity and gas velocity on droplet spray characteristics including droplet entrainment zone (e.g. angle and distance) and flow development regions described by droplet density and droplet distribution that is shown in FIGS. 11 and 12. The fluid flow rate was chosen to be 20 ml/min.

FIGS. 9A-9D are photographs of four different combinations of droplet velocity, $U_d$ and gas velocity, $U_g$. The droplet entrainment angle, $\theta_r$, the direction at which the outer co-flow fluid droplets converge towards the center axis for the conditions in FIGS. 9A-9D, are measured to be about 43.26°, 24.44°, 55.0°, and 29.05°, respectively. When droplet velocity increases (conditions FIG. 9A vs. FIG. 9B or FIG. 9C vs. FIG. 9D), the droplet impingement angle, $\theta_r$, becomes smaller. A smaller value of $\theta_r$ allows droplets to be entrained slowly with a comparatively longer downstream distance resulting in a larger droplet entrainment zone. With an increase in gas velocity (conditions FIG. 9A vs. FIG. 9C or FIG. 9B vs. FIG. 9D), the droplet entrainment angle increases leading to a smaller droplet entrainment zone. These parameters can be used to optimize the spray parameters for a given application.

Experiments revealed a droplet-free zone at the center of the spray after its exit from the gas nozzle. After a certain distance that depends on the spray condition, the droplet and the gas merge and droplets distribute uniformly across the jet flare. The flow development behavior is characterized in FIGS. 11A & 11B, and also in FIGS. 11C & 11D. When the gas exits at the center, it entrains the surrounding fluid droplets creating a converging droplet entrainment zone around the gas nozzle for a certain distance. The resultant droplet-gas jet then diverges, but the mixing or flow development continues. The entire flow development region starting from the gas nozzle exit point can be described by three distinct regions: near-field (NF), intermediate-filed (IF), and far-field (FF), which are illustrated in FIG. 12A. These regions are usually characterized by a normalized axial position, $x/d_g$, where $d_g$ is the exit diameter of the gas nozzle. Typical cross-sections A-A, B-B, and C-C of the jet flare at the NF, IF, and FF regions are shown in FIGS. 12B-12D, and the full spray pattern in FIG. 12A. In the NF region, a potential core is observed with absence of the outer co-flow medium. In contrast, in the FF region, no potential core is observed as the mixing is fully-developed (i.e. 'self-similar' state) and hence, the droplets are uniformly distributed throughout the jet flare. The IF or transition region that lies between these two regions contains a few droplets as it approaches to the FF region.

A liquid dispensing into still ambient air or parallel moving air/gas, defines an FF region is approximately $x/d_g \geq 25$. See, Rukosuyev, M., et al., "Design and development of cutting fluid system based on ultrasonic atomization for micro-machining," Transaction of the NAMRI/SME 38: 97-104 (2010); Fellouah, H., et al., "Reynolds number effects within the development region of a turbulent round free jet," International Journal of Heat and Mass Transfer 52: 3943-3954 (2009).

The experimental device used 1.6 mm, and hence, the self-similar state (i.e. distance between the gas nozzle exit and the FF region) is expected to fall at 40 mm or beyond. However, the fully-developed or FF region was 24-35 mm, which is smaller than predicted by past studies. The early flow development of the self-similar state in the experiments testing embodiments of the invention could be attributable to the density of the center gas (air-$CO_2$) being lower than the outer co-flow gas (droplet). Also, when gas velocity decreases, the distance between the gas nozzle exit and the FF region becomes shorter. The experiments suggest that the downstream distance for the self-similar state, where the flow becomes asymptotic, gets smaller with the reduction in gas velocity.

The experiments show that droplet and gas velocities in an ACF spray system influence the droplet entrainment mechanism and the droplet-gas mixing behavior at the center jet. A combination of a higher droplet velocity (1.2 m/s) and a lower gas velocity (26 m/s), among four spray conditions observed, provides the best spray condition in terms of droplet entrainment angle.

The behavior can be modeled to provide a theoretical relationship of droplet and gas velocities with droplet entrainment angle and entrainment zone, and their influence on droplet density and distribution across the jet flare at three different regions (i.e. NF, IF, and FF). When a high-velocity fluid is dispensed into a still atmospheric air or to a low-velocity parallel moving fluid, entrainment of the outer fluid into the inner fluid takes place. As the high-velocity fluid jet flows at a dynamic pressure, its static pressure reduces according to Bernoulli's principle. This causes a pressure difference between the jet domain and the surrounding fluid/air. Moreover, if a compressible fluid like gas is dispensed (exit from a nozzle), it immediately expands in the radial direction. The pressure difference and the gaseous nature of the dispensing fluid cause entraining of the outer surrounding gas or air to flow in and mix with the center gas. Due to differences in fluid properties and flow dynamics between the center jet and the outer droplets, one fluid diffuses into the other and vice versa. The slow-moving droplets cause aerodynamic drag to the high-velocity gas that results in deceleration of the gas, and the momentum lost by the high-velocity gas is received by the droplets. Their momentum gradually evolves to an equilibrium state (i.e. fully-developed) as the jet moves forward. A fully-developed flow is desirable. In FIG. 12A, the point where the far-field region starts is ideal point for a tool-surface interface to be located (also the point where the central droplet free core ends). As a result, the velocity or dynamic pressure of the center jet, which is assumed to follow a Gaussian profile, and decays with respect to the downstream position as seen in FIGS. 11A-11D and 12A-12D.

In the experiments, it was also shown that an increase of the droplet velocity (e.g., up to 1 m/s) with a decrease of the gas velocity (e.g., 36 m/s to 26 m/s when measure at about 35 mm downstream distance from the gas nozzle 32) produce a better spray. The droplets-gas co-flow develop in short distance. This provides a potential core that does not contains droplets disappear early. The droplet entrainment angle becomes smaller with this combination (compare FIG. 9B with other three 9A, 9C, 9D). As the decay of a high-velocity spray jet is evident over the distance, it is desirable to use this high-momentum droplets-gas mixed jet for achieving effective cooling and lubrication in the machining application as soon as they achieve an equilibrium state. An example optimization was conducted in the experiments. Specifically, with the example experimental geometries, co-flow development was found to take place at a 26-35 mm spray distance (from the gas exit 32), which is about 16-22 times of the gas nozzle exit diameter of 1.6 mm. In the experimental nozzle system consistent with FIG. 1A, and illustrated in FIG. 4 the example exit diameter of the nozzle section 44 was 18.8 mm (with outer dia of 25 mm). Variations are permitted. Factors that affect the size of the diameter is that it should be small enough to permit positioning close to a cutting surface during machining. It also should be large enough to avoid detrimental droplet agglomeration which occurs when droplets will hit the nozzle inner surface. In the experimental device, the exit of the gas nozzle 32 was placed 3-5 mm inside of the nozzle section, which provided better control of the droplets in view of the example droplet nozzle size. The goal in choosing this placement is to promote the droplets to enter the droplet entrainment zone before the droplets exit the nozzle.

To estimate the droplet entrainment angle, the following assumptions are made about the nature of the droplets:

Fluid droplets inside the droplet nozzle uniformly mix with the ambient air and create a homogenous droplet vapor. It appears to be a single gaseous phase, but different from the centerline gas jet in nature;

Fluid droplets do not interact each other during flow (non-condensing).

The fluid droplets are uniform in size.

Gravitational force acting on the droplets is ignored.

When a high-velocity gas is dispensed from a nozzle, the pressure difference between the jet and the surrounding rest or co-flow jet increases with the increase in its velocity. The Gaussian mean velocity profile shown in FIGS. 12A-12D implies that the velocity or dynamic pressure of the jet is the largest at the center producing to the least static pressure. In ACF spray system, the velocity of a static single droplet, $U_{gs}$ towards the jet center due to a reduced static pressure can be calculated from Bernoulli's principle:

$$P_d - P_{gs} = \frac{1}{2}\rho_d U_{gs}^2, \tag{1}$$

where, $P_d$, $P_{gs}$, $\rho_d$ refer to the static pressure of the droplets in the droplet nozzle, the static pressure of the gas at the jet center, and the droplet equivalent density of the droplet vapor, respectively. The pressure difference, ($P_d$–$P_{gs}$) can be directly measured from a piezometer. The static pressure at the jet center, $P_{gs}$ decreases with an increase in gas velocity. For a given control volume consisting of a circular ACF nozzle unit, an equivalent density of the droplet vapor can be calculated using mass conservation law:

$$\rho_d = \frac{\rho_f \dot{V}_f t + \rho_a (V_N - \dot{V}_f t)}{V_N}, \tag{2}$$

where, $\rho_f$ and $\rho_a$ are the fluid and air densities, $\dot{V}_f$ is the volumetric fluid flow rate, t is time, $V_N$ is the control volume in round nozzle.

When a single droplet that is entrained in the droplet entrainment zone (formed around the potential core immediately after the gas nozzle exit) approaches to flow in the center at an angle, $\theta_{gs}$ due to the static pressure drop, the dynamic pressure of the jet that flows at a high velocity, $U_g$ pulls off the droplet in its flow direction at a velocity, $U_{gr}$ at the outer contour of the jet. The flow of the droplet due to velocities, $U_d$, $U_{gs}$, and $U_{gr}$ can be represented by the velocity diagram of FIG. 10. The resultant droplet entrainment angle, $\theta_r$ of a co-flowing droplet can be expressed as:

$$\theta_r = \tan^{-1}\left(\frac{U_{gs}}{U_d + U_{gr}}\right), \tag{3}$$

where $U_{gr}$ is the velocity at the outer contour of the jet, and its value is obtained as:

$$U_{gr} = k_x U_{gx}, \quad (4)$$

where, $k_x$ is a proportionality constant, and $U_{gx}$ is the local jet velocity in the x-axis. At the nozzle exit, x=0, the value of $U_{gx}$ is approximately equal to $U_g$; however, it decreases with the increase in downstream distance as the velocity of the jet decays. Also, for a compressible non-viscous fluid flow, $k_x \approx 1$ at x=0, because the velocity at the jet center is approximately equal to the velocity at the outer contour.

Equation 3 states that the droplet entrainment angle can be influenced by both gas velocity and droplet velocity. A higher droplet velocity, $U_d$ governs a droplet to follow at a smaller angle, $\theta_r$ with respect to the jet axis. However, the dependence of gas velocity, $U_g$ on the value of $\theta_r$ is a bit complex. With the increase in gas velocity, $U_g$, both $U_{gr}$ and $U_{gs}$ increase. Note that, if the value of $U_g$ (or dynamic pressure) of the jet increases, the value of $U_{gs}$ also increases due to a comparatively larger static pressure drop, $(P_d - P_{gs})$. Predicting the influence of $U_g$ requires knowledge of the value of the static pressure of the jet, $P_{gs}$.

The expression for the droplet entrainment angle, $\theta_r$ in Eqn. (3) is obtained considering a single droplet in the droplet entrainment zone. However, when considering a number of droplets around the center jet, the droplet that is close to the gas jet contour will move faster than the one that is farther away. Therefore, the value of $\theta_r$ estimated from the above relationship for a co-flow jet may not be accurate.

The density and distribution of droplets across the jet flares at locations A, B, and C for three different regions: NF, IF and FF, vary as shown in FIGS. 12A-12D due to gradual mixing between the droplets and the gas with respect to the downstream distance. Across the jet flare at cross-section A-A, the resultant jet of the droplets and the gas does not significantly diverge. Diffusion between the droplets and the gas is minimal. As a potential core (i.e. no presence of the droplets) is distinctly observed at the center and the combined jet has a smaller outer contour, the number of droplets for a given volume (i.e. droplet density) becomes too high. Across the jet flare at C-C, the diffusion is fully-developed, and the jet contains a larger contour because of divergence. As a result, the droplets uniformly distribute and the droplet density becomes smaller. At the cross-section B-B, the number of droplets across the jet flare may not be significant, but the size of potential core becomes smaller. If for the locations A, B, C, a small length, $\Delta x$ is considered in both directions along x-axis, the average droplet density across the jet at the respective locations can be estimated as:

$$\rho_{dA} = \frac{N}{2\pi \Delta x (r_{jA}^2 - r_{pA}^2)} \quad (5a)$$

$$\rho_{dB} = \frac{N}{2\pi \Delta x (r_{jB}^2 - r_{iB}^2)} \quad (5b)$$

$$\rho_{dC} = \frac{N}{2\pi \Delta x r_{jC}^2}, \quad (5c)$$

where, N is the number of fluid droplets depending on the flow rate and atomizer frequency, $r_{jA}$, $r_{jB}$, $r_{jC}$ are radii of the jet boundary layer at the locations A, B, C, respectively, and $r_{pA}$, $r_{iB}$ are radii of the potential core and the intermediate core at the locations, A, B, respectively. The jet boundary layer suffers from an eddy (turbulence) effect due to entrainment of atmospheric air. As such, average values of $r_{jB}$ and $r_{jC}$ should be taken for the intermediate and far-field regions. Eqns. 5(a)-(c) suggest that the average droplet density is significantly higher at location A followed by medium at location B, and the least at location C.

The droplet vapor is assumed to behave like one medium as a non-condensing gas. However, the fluid droplets may interact, especially when they come close or touch each other. This situation can occur in two ways: during entrainment in the droplet entrainment zone and during mixing within the NF (i.e. near-field) region. For a set of droplet and gas velocities, if the droplet entrainment angle increases, then the size of the droplet entrainment zone decreases due to a smaller downstream distance. In such a case, the droplet density becomes higher and the distance between the droplets may reduce. If two or more droplets touch each other, they will result in condensation and will form, comparatively, a larger droplet. Also, during mixing within the NF region, the entire amount of droplets usually passes through a smaller jet flare (for example, at cross section A-A in FIGS. 12A & 12B). As the droplets again become closer, there is an increased risk of condensation effect. When droplet size becomes larger, it can influence film formation behavior, and hence will affect the cooling and lubrication characteristics during machining.

To avoid condensation of the fluid droplets in the entrainment zone and next in the mixing region (i.e. near-filed and intermediate-field), it is preferable to allow the droplets to be entrained slowly and gradually until the intermediate region. In such a case, the radius of the jet at the NF and the IF regions will increase and the droplet density will decrease that will protect the fluid droplets from condensation. FIGS. 11A and 11B together and FIGS. 11C and 11D together respectively illustrate schematic diagrams for a smaller and a larger droplet impingement angles. A smaller droplet entrainment angle leads to increase the size of the droplet entrainment zone as well as the radius of the droplet-gas resultant jet, $r_j$. Using Eqn. (5a), it can be seen that the average droplet density for a larger value of angle $\theta_r$ (say, $\theta_{r1}$) at the same location A of the potential core will be higher than that for a smaller value of $\theta_r$ (say, $\theta_{r2}$). Thus, if $\theta_{r1} > \theta_{r2}$, then $\rho_{d1} > \rho_{d2}$ since $r_{j1} < r_{j2}$. This condition can be achieved by controlling both the gas velocity and the droplet velocity that control the droplet entrainment angle (Eqn. (3)). During machining with ACF spray system, the center of the jet is directed toward the cutting zone. A fully-developed flow achieves a uniform fluid film for penetrating into the tool-chip interface.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

TABLES

TABLE 1

Thermo-physical properties of 10% S-1001 cutting fluid and water.

| Fluid | Surface tension (mN/m) | Density (kg/m³) | Viscosity (cP) | Thermal conductivity (W/mK) |
|---|---|---|---|---|
| Water | 72 | 1000 | 1.01 | 0.58 |
| 10% S-1001 | 41 | 1003 | 1.22 | 0.53 |

TABLE 2

Factor levels for the ACF spray system parameters

| Parameters | Low (−) | High (+) |
|---|---|---|
| ($x_1$) Gas pressure (psi) | 150 | 300 |
| ($x_2$) Fluid flow rate (ml/min) | 10 | 20 |
| ($x_3$) Impingement angle (°) | 25 | 35 |
| ($x_4$) Spray distance (mm) | 25 | 35 |
| ($x_5$) Mist carrier gas type | $N_2$ | Air-$CO_2$ |

TABLE 3

Shows values of We and Ky at given ACF spray conditions.

| Impact Angle, $x_3$ (°) | Gas velocity, $v_g$ (m/s) | Normal velocity, $u_o$ (m/s) | We | Ky at $x_2$* 10 | Ky at $x_2$* 20 |
|---|---|---|---|---|---|
| 25 | 26 | 10.99 | 144.17 | 3.85 | 2.97 |
| 35 | 26 | 14.91 | 265.55 | 5.23 | 4.03 |
| 25 | 36 | 15.21 | 276.39 | 5.34 | 4.11 |
| 35 | 36 | 20.65 | 509.11 | 7.24 | 5.58 |

(*calculated at 50% effective flow rate)

TABLE 4

Experimental results for different ACF spray conditions and flood coolant condition.

| Test | RO | $x_1$ | $x_2$ | $x_3$ | $x_4$ | $x_5$ | Thrust | Feed | Tangential | Resultant | Tool life (min) | Friction coefficient |
|---|---|---|---|---|---|---|---|---|---|---|---|---|
| 1 | 9 | − | − | − | − | + | 140.28 | 149.42 | 433.85 | 479.83 | 8 | 0.50 |
| 2 | 10 | + | − | − | − | − | 116.19 | 156.81 | 401.65 | 446.55 | 10 | 0.56 |
| 3 | 6 | − | + | − | − | − | 145.64 | 151.96 | 480.96 | 525.00 | 6 | 0.47 |
| 4 | 13 | + | + | − | − | + | 126.20 | 137.95 | 431.41 | 470.18 | 9 | 0.47 |
| 5 | 2 | − | − | + | − | − | 123.78 | 124.08 | 406.33 | 442.51 | 8 | 0.45 |
| 6 | 1 | + | − | + | − | + | 123.50 | 130.39 | 443.47 | 478.46 | 7 | 0.44 |
| 7 | 14 | − | + | + | − | + | 133.29 | 133.88 | 415.43 | 456.36 | 8 | 0.48 |
| 8 | 4 | + | + | + | − | − | 135.21 | 147.86 | 439.08 | 482.63 | 10 | 0.49 |
| 9 | 16 | − | − | − | + | − | 115.09 | 109.68 | 415.26 | 444.66 | 8 | 0.40 |
| 10 | 8 | + | − | − | + | + | 139.50 | 151.61 | 453.02 | 497.67 | 8 | 0.49 |
| 11 | 12 | − | + | − | + | + | 134.52 | 144.51 | 448.24 | 489.80 | 10 | 0.46 |
| 12 | 7 | + | + | − | + | − | 149.50 | 158.03 | 442.70 | 492.70 | 8 | 0.52 |
| 13 | 15 | − | − | + | + | + | 133.96 | 146.80 | 452.90 | 494.58 | 9 | 0.48 |
| 14 | 11 | + | − | + | + | − | 129.17 | 137.52 | 418.77 | 459.31 | 7 | 0.48 |
| 15 | 5 | − | + | + | + | − | 126.93 | 149.29 | 427.87 | 470.61 | 11 | 0.51 |
| 16 | 3 | + | + | + | + | + | 140.13 | 141.28 | 431.86 | 475.50 | 6 | 0.48 |
| 17 | Flood coolant condition | | | | | | 121.63 | 126.82 | 412.15 | 448.04 | 7 | 0.46 |

TABLE 5

Values of significant effects.

| Response | Factors | Effect |
|---|---|---|
| Tool life | Pressure-Spray distance | −1.88 |
| | Pressure-Impingement angle | −1.13 |
| | Impingement angle-Gas type | −1.13 |
| | Flow rate-Impingement angle | 0.63 |

The invention claimed is:

1. An atomizing cutting fluid system, comprising:
a common chamber terminating in a shaped droplet nozzle and including a nozzle section immediately behind the shaped droplet nozzle;
an atomizer that creates spray directly within the common chamber behind the nozzle section;
a cutting fluid supply line to provide cutting fluid to the atomizer; and
a high velocity gas nozzle within the nozzle section and behind the droplet nozzle configured to provide a high velocity gas to entrain the flow of droplets, wherein the nozzle section and droplet nozzle are configured to produce a fully developed droplets-gas flow at a predetermined distance from the droplet nozzle.

2. The system of claim 1, further comprising a high velocity gas mixing section that mixes air and $CO_2$ in a ratio that produces a temperature slightly higher than the freezing point of water to the high velocity gas nozzle.

3. The system of claim 1, further comprising a gravity fed, pumpless cutting fluid supply tank supplying cutting fluid to the cutting fluid supply line.

4. The system of claim 1, wherein the high velocity gas nozzle and the droplet nozzle are co-axially disposed.

5. The system of claim 1, wherein the droplet nozzle and the nozzle section provide a ~4° convergence with ~18.8 mm exit at the droplet nozzle, there is a ~0.75° convergence with ~1.6 mm exit at the high velocity gas nozzle and the high velocity gas nozzle exit is ~5 mm behind the droplet nozzle.

6. The system of claim 1, used in a method to machine titanium alloy and disposed at the predetermined distance to create a thin film on a tool substrate and effectively penetrate that film into the tool-chip interface.

7. The system of claim 6, further comprising a system controller, wherein droplet flow velocity and gas velocity are controlled by said system controller to set a droplet entrainment angle that produces a focused droplet and entrained flow at the predetermined distance.

8. The system of claim 7, wherein the droplet flow velocity, droplet size, and gas velocity are controlled to allow droplets to be entrained and mixed gradually until achieving a fully-developed flow region.

9. The system of claim 1, further comprising a high velocity gas delivery supply that delivers high molecular weight inert gas to the high velocity gas nozzle.

10. The system of claim 1, further comprising air inlets disposed behind the atomizer to disperse and create a flow of droplets created by the atomizer.

11. The system of claim 1, wherein said cutting fluid supply line provides cutting fluid in close proximity and in front of a tip of the atomizer.

12. The system of claim 11, further comprising a valve to control delivery of cutting fluid from said cutting fluid supply line.

13. The system of claim 12, wherein said valve comprises a plurality of valves including a shut-off valve upstream of a flow control valve.

14. The system of claim 1, wherein said cutting fluid supply line provides cutting fluid through a body center of the atomizer.

15. The system of claim 1, wherein said cutting fluid is supplied via gravity flow without any pump.

16. A cutting system including a cutting fluid system of claim 1, the cutting system including a tool, the cutting fluid system being arranged to deliver a thin film at an interface between the tool and a workpiece.

17. The system of claim 1, wherein the high velocity gas comprises a mixture of air and $CO_2$ in a ratio that produces a droplets-gas flow having a temperature in the range of ~1-4° C.

* * * * *